US012809162B2

(12) United States Patent
Hazen et al.

(10) Patent No.: US 12,809,162 B2
(45) Date of Patent: Nov. 24, 2026

(54) ANTI-FOGGING OPTICAL LENS AND SYSTEM

(71) Applicant: GALVION LTD., Portsmouth, NH (US)

(72) Inventors: Michael Hazen, New Boston, NH (US); Thomas Dion, Haverhill, MA (US)

(73) Assignee: GALVION LTD., Portsmouth, NH (US)

( * ) Notice: Subject to any disclaimer, the term of this patent is extended or adjusted under 35 U.S.C. 154(b) by 880 days.

(21) Appl. No.: 18/190,699

(22) Filed: Mar. 27, 2023

(65) Prior Publication Data

US 2023/0350194 A1 Nov. 2, 2023

Related U.S. Application Data

(60) Provisional application No. 63/326,029, filed on Mar. 31, 2022.

(51) Int. Cl.
*G02B 27/00* (2006.01)
*A42B 3/24* (2006.01)
(Continued)

(52) U.S. Cl.
CPC .......... *G02B 27/0006* (2013.01); *A42B 3/245* (2013.01); *H05B 3/84* (2013.01);
(Continued)

(58) Field of Classification Search
CPC ........ G02B 27/0006; H05B 3/84; A42B 3/245
See application file for complete search history.

(56) References Cited

U.S. PATENT DOCUMENTS 2,378,642 A 6/1945 Kopplin
2,452,999 A 11/1948 Daly et al.
(Continued)

FOREIGN PATENT DOCUMENTS

CN 1434282 A1 8/2003
CN 103163569 A 6/2013
(Continued)

OTHER PUBLICATIONS

SFC, About SFC Smart Fuel Cell, (2009) replay.waybackmachine.org/20090122152343/http://www.sfc.com/en/about-sfc.html, 1 page.
(Continued)

*Primary Examiner* — Thomas E Lazo
(74) *Attorney, Agent, or Firm* — DAY PITNEY LLP; George N. Chaclas; Christopher J. Head

(57) ABSTRACT

An active anti-fog eyewear system includes a lens with a conductive layer and a power source to provide an electrical current to the conductive layer. When the current is provided to the conductive layer, the conductive layer generates heat. A portion of the conductive layer that is positioned in front of the eyes of a wearer of the eyewear, and a corresponding portion of the lens, is heated more rapidly than other portions of the conductive layer and lens. Condensed water vapor is rapidly cleared from the portion of lens that is positioned in front of the wearer's eyes. The lens can include electrodes positioned near the top of the lens to direct the current to the portion of the conductive layer that is positioned within a line of sight of the wearer.

17 Claims, 7 Drawing Sheets

(51) Int. Cl.
*H05B 3/84* (2006.01)
*G02B 27/01* (2006.01)

(52) U.S. Cl.
CPC .. *G02B 27/0172* (2013.01); *G02B 2027/0178* (2013.01); *H05B 2203/013* (2013.01)

(56) References Cited

U.S. PATENT DOCUMENTS 2,468,697 A 4/1949 Wiley
2,666,951 A 1/1954 Grove
2,814,043 A 11/1957 Alesi
3,018,210 A 1/1962 Frieder et al.
3,154,788 A 11/1964 Simpson
3,264,392 A 8/1966 Taplin
3,280,246 A 10/1966 Lawson et al.
3,349,153 A 10/1967 Beck
3,383,705 A 5/1968 Raschke
3,726,953 A 4/1973 Jones et al.
3,758,889 A 9/1973 Erb
3,967,050 A 6/1976 Makihara et al.
4,023,209 A 5/1977 Frieder, Jr. et al.
4,044,268 A 8/1977 Hammel et al.
4,263,679 A 4/1981 Erlendson
4,361,384 A 11/1982 Bosserman
4,449,787 A 5/1984 Burbo et al.
4,589,075 A 5/1986 Buennagel
4,810,832 A 3/1989 Spinner et al.
4,868,929 A * 9/1989 Curcio ...................... A61F 9/02 2/435
4,888,831 A 12/1989 Oleson
4,910,100 A 3/1990 Nakanishi et al.
4,931,947 A 6/1990 Werth et al.
4,942,628 A 7/1990 Freund
4,942,629 A * 7/1990 Stadlmann ............. G02C 11/08 2/435
4,943,222 A 7/1990 Nathoo
5,042,093 A 8/1991 Legendre
5,151,277 A 9/1992 Bernardon et al.
5,153,496 A 10/1992 Laforge
5,258,244 A 11/1993 Hall et al.
5,315,718 A 5/1994 Barson et al.
5,321,349 A 6/1994 Chang
5,351,339 A * 10/1994 Reuber .................. A42B 3/226 2/9
5,471,036 A * 11/1995 Sperbeck ................. H05B 3/84 2/435
5,551,094 A 9/1996 Navone
5,570,002 A 10/1996 Castleman
5,572,749 A 11/1996 Ogden
5,578,158 A 11/1996 Gutowski et al.
5,581,819 A 12/1996 Garneau
5,601,852 A 2/1997 Seemann
5,650,240 A 7/1997 Rogers
5,675,754 A 10/1997 King et al.
5,683,831 A 11/1997 Baril et al.
5,754,445 A 5/1998 Jouper et al.
5,794,272 A 8/1998 Workman et al.
5,831,198 A 11/1998 Turley et al.
5,898,291 A 4/1999 Hall
5,898,949 A 5/1999 Barthold et al.
5,903,764 A 5/1999 Shyr et al.
5,914,585 A 6/1999 Grabon
5,945,806 A 8/1999 Faulk
5,977,656 A 11/1999 John
5,986,437 A 11/1999 Lee
6,014,013 A 1/2000 Suppanz et al.
6,025,696 A 2/2000 Lenhart et al.
6,032,297 A 3/2000 Barthold et al.
6,046,514 A 4/2000 Rouillard et al.
6,081,931 A 7/2000 Burns et al.
6,087,035 A 7/2000 Rogers et al.
6,137,280 A 10/2000 Ackermann et al.
6,198,642 B1 3/2001 Kociecki et al.
6,221,522 B1 4/2001 Zafred et al.
6,223,077 B1 4/2001 Schweizer et al.
6,246,215 B1 6/2001 Stanesti
6,265,846 B1 7/2001 Flechsig et al.
6,271,646 B1 8/2001 Evers et al.
6,292,952 B1 9/2001 Watters et al.
6,366,061 B1 4/2002 Carley et al.
6,366,333 B1 4/2002 Yamamoto et al.
6,370,050 B1 4/2002 Peng et al.
6,376,938 B1 4/2002 Williams
6,396,391 B1 5/2002 Binder
6,459,175 B1 10/2002 Potega
6,476,581 B2 11/2002 Lew
6,485,852 B1 11/2002 Miller et al.
6,492,050 B1 12/2002 Sammes
6,530,026 B1 3/2003 Bard
6,541,879 B1 4/2003 Wright
6,608,463 B1 8/2003 Kelly et al.
6,627,339 B2 9/2003 Haltiner
6,628,011 B2 9/2003 Droppo et al.
6,633,823 B2 10/2003 Bartone et al.
6,690,585 B2 2/2004 Betts
6,694,270 B2 2/2004 Hart
6,703,722 B2 3/2004 Christensen
6,707,284 B2 3/2004 Lanni
6,807,838 B2 10/2004 Iwaya
6,828,695 B1 12/2004 Hansen
6,831,848 B2 12/2004 Lanni
6,925,361 B1 8/2005 Sinnock
6,968,575 B2 11/2005 Durocher
6,981,863 B2 1/2006 Renault et al.
6,985,799 B2 1/2006 Zalesski et al.
7,001,682 B2 2/2006 Haltiner
7,002,265 B2 2/2006 Potega
7,036,028 B2 4/2006 Zalesski
7,071,660 B2 7/2006 Xu et al.
7,076,592 B1 7/2006 Ykema
7,105,946 B2 9/2006 Akiyama et al.
7,124,449 B2 10/2006 Sutter et al.
7,166,937 B2 1/2007 Wilson et al.
7,178,175 B2 2/2007 Rogers et al.
7,188,003 B2 3/2007 Ransom et al.
7,203,849 B2 4/2007 Dove
7,212,407 B2 5/2007 Beihoff et al.
7,226,681 B2 6/2007 Florence et al.
7,235,321 B2 6/2007 Sarkar et al.
7,243,243 B2 7/2007 Gedeon
7,256,516 B2 8/2007 Buchanan et al.
7,274,175 B2 9/2007 Manolescu
7,385,373 B2 6/2008 Doruk et al.
7,388,349 B2 6/2008 Elder et al.
7,408,794 B2 8/2008 Su
7,436,687 B2 10/2008 Patel
7,444,445 B2 10/2008 Kubo et al.
7,506,179 B2 3/2009 Templeton
7,531,915 B2 5/2009 Wang et al.
7,541,693 B2 6/2009 Huang et al.
7,590,684 B2 9/2009 Herrmann
7,595,815 B2 9/2009 Donovan et al.
7,618,260 B2 11/2009 Daniel et al.
7,646,107 B2 1/2010 Smith
7,674,543 B2 3/2010 Chiang et al.
7,675,758 B2 3/2010 Artusi et al.
7,683,575 B2 3/2010 Berdichevsky et al.
7,701,082 B2 4/2010 Lazarovich et al.
7,770,239 B1 8/2010 Goldman et al.
7,778,940 B2 8/2010 Mazzarella
7,808,122 B2 10/2010 Menas et al.
7,814,348 B2 10/2010 Krajcovic et al.
7,834,479 B2 11/2010 Capp et al.
7,838,142 B2 11/2010 Scheucher
7,844,370 B2 11/2010 Pollack et al.
7,847,532 B2 12/2010 Potter et al.
7,849,341 B2 12/2010 Sugiyama
7,855,528 B2 12/2010 Lee
7,873,844 B2 1/2011 Diab et al.
7,928,720 B2 4/2011 Wang
D640,192 S 6/2011 Robinson et al.
8,020,220 B2 9/2011 Mcelroy et al.
8,073,554 B2 12/2011 Vezza et al.

(56) References Cited

U.S. PATENT DOCUMENTS 8,086,281 B2 12/2011 Rabu et al.
8,103,892 B2 1/2012 Krajcovic
8,106,537 B2 1/2012 Casey et al.
8,138,631 B2 3/2012 Allen et al.
8,140,194 B2 3/2012 Iino et al.
8,164,217 B1 4/2012 Miller
8,178,999 B2 5/2012 Burger et al.
8,193,661 B2 6/2012 Jagota et al.
8,255,090 B2 8/2012 Frader-Thompson et al.
8,279,642 B2 10/2012 Chapman et al.
8,294,307 B2 10/2012 Tsai
8,304,122 B2 11/2012 Poshusta et al.
8,312,299 B2 11/2012 Tremel et al.
8,315,745 B2 11/2012 Creed
8,333,619 B2 12/2012 Kondo et al.
8,352,758 B2 1/2013 Atkins et al.
8,353,066 B2 1/2013 Rogers et al.
8,365,619 B2 * 2/2013 Ziegler .................. G01N 21/59 356/432
8,375,229 B2 2/2013 Saeki
8,399,805 B2 * 3/2013 Biddell .................. A42B 3/245 219/203
8,401,709 B2 3/2013 Cherian et al.
8,425,240 B2 4/2013 Lee et al.
8,438,619 B2 5/2013 Olson
8,447,435 B1 5/2013 Miller et al.
8,455,794 B2 6/2013 Vogel
8,466,662 B2 6/2013 Nania et al.
8,476,581 B2 7/2013 Babayoff et al.
8,494,479 B2 7/2013 Budampati et al.
8,508,166 B2 8/2013 Marcinkiewicz et al.
8,548,607 B1 10/2013 Belz et al.
8,566,962 B2 * 10/2013 Cornelius .............. G02C 11/08 2/15
8,599,588 B2 12/2013 Adest et al.
8,611,107 B2 12/2013 Chapman et al.
8,614,023 B2 12/2013 Poshusta et al.
8,633,619 B2 1/2014 Robinson et al.
8,636,011 B2 1/2014 Strickland et al.
8,638,011 B2 1/2014 Robinson et al.
8,643,326 B2 2/2014 Campanella et al.
8,648,492 B2 2/2014 Craig et al.
8,649,914 B2 2/2014 Miller et al.
8,682,496 B2 3/2014 Schweitzer, III et al.
D706,711 S 6/2014 Robinson et al.
8,739,318 B2 6/2014 Durocher
8,763,077 B2 6/2014 Oberheide et al.
8,775,846 B2 7/2014 Robinson et al.
8,781,640 B1 7/2014 Miller
8,796,888 B2 8/2014 Rice et al.
8,826,463 B2 9/2014 Teetzel et al.
8,829,713 B2 9/2014 Ishigaki et al.
8,849,471 B2 9/2014 Daniel et al.
8,853,891 B2 10/2014 Soar
8,854,389 B2 10/2014 Wong et al.
8,890,474 B2 11/2014 Kim et al.
8,901,774 B2 12/2014 Yan et al.
8,913,406 B2 12/2014 Guthrie et al.
8,970,176 B2 3/2015 Ballatine et al.
8,984,665 B2 3/2015 Celona et al.
9,001,005 B2 4/2015 Abdollahi et al.
9,003,858 B1 4/2015 Lin et al.
9,041,349 B2 5/2015 Bemmel et al.
9,043,617 B2 5/2015 Miki
9,093,862 B2 7/2015 Dennis et al.
9,101,175 B2 8/2015 Redpath et al.
9,142,957 B2 9/2015 Malmberg et al.
9,158,294 B2 10/2015 Carralero et al.
9,190,673 B2 11/2015 Venkataraman et al.
9,203,302 B2 12/2015 Kelly
9,207,735 B2 12/2015 Khaitan et al.
9,216,523 B2 12/2015 Monforte, II et al.
9,247,779 B1 2/2016 Aloumanis et al.
9,307,803 B1 4/2016 Folgar
9,335,764 B2 5/2016 Herz et al.
9,337,943 B2 5/2016 Mosebrook et al.
9,343,758 B2 5/2016 Poshusta et al.
9,356,173 B2 5/2016 Okandan et al.
9,364,975 B2 6/2016 Preisler et al.
9,450,274 B2 9/2016 Vo et al.
9,452,475 B2 9/2016 Armstrong et al.
9,502,894 B2 11/2016 Holmberg et al.
9,560,049 B2 1/2017 Srinivasan
9,565,885 B2 2/2017 Hedges et al.
9,615,067 B1 4/2017 Foote et al.
9,634,491 B2 4/2017 Robinson et al.
9,698,596 B2 7/2017 Sauer et al.
9,722,435 B2 8/2017 Park
9,807,319 B2 10/2017 Teich et al.
9,860,709 B2 1/2018 Addepalli et al.
9,958,278 B2 5/2018 Habib et al.
9,959,591 B2 5/2018 Sendai et al.
10,063,594 B2 8/2018 Winn et al.
10,079,488 B2 9/2018 Challancin
10,165,817 B2 1/2019 Redpath et al.
10,250,134 B2 4/2019 Long et al.
10,324,290 B2 6/2019 Weller et al.
10,333,315 B2 6/2019 Robinson et al.
10,343,552 B2 7/2019 Ashcraft et al.
10,398,601 B2 * 9/2019 Cornelius ................. A61F 9/02
10,448,695 B2 10/2019 Folgar
10,565,731 B1 2/2020 Reddy et al.
10,623,622 B1 4/2020 Slavin et al.
D900,407 S 10/2020 Hanudel et al.
10,888,037 B1 * 1/2021 Toleno ................... G05D 23/19
10,928,163 B2 2/2021 Zimmer
11,096,440 B2 * 8/2021 Tsai ......................... A42B 3/24
11,163,931 B2 11/2021 Ricci
2002/0135492 A1 9/2002 Reagan et al.
2003/0006905 A1 1/2003 Shieh et al.
2003/0054215 A1 3/2003 Doshi et al.
2003/0085621 A1 5/2003 Potega
2003/0234729 A1 12/2003 Shen
2004/0061380 A1 4/2004 Hann et al.
2004/0125618 A1 7/2004 De Rooij et al.
2004/0239287 A1 12/2004 Batts-Gowins
2005/0037241 A1 2/2005 Schneider et al.
2005/0102043 A1 5/2005 Menas et al.
2005/0217006 A1 10/2005 Sutter et al.
2005/0255770 A1 11/2005 Crump
2005/0275372 A1 12/2005 Crowell
2006/0007562 A1 1/2006 Willey et al.
2006/0101556 A1 5/2006 Goldsborough
2006/0101560 A1 5/2006 Ketterer et al.
2006/0127725 A9 6/2006 Sarkar et al.
2006/0256093 A1 11/2006 Furukawa et al.
2007/0007823 A1 1/2007 Huang et al.
2007/0035629 A1 2/2007 Braunstein et al.
2007/0078230 A1 4/2007 Lai
2007/0141424 A1 6/2007 Armstrong et al.
2007/0184339 A1 8/2007 Scheucher
2007/0222301 A1 9/2007 Fadell et al.
2007/0257654 A1 11/2007 Krajcovic et al.
2008/0024007 A1 1/2008 Budampati et al.
2008/0130321 A1 6/2008 Artusi et al.
2008/0263752 A1 10/2008 Solinsky et al.
2008/0269953 A1 10/2008 Steels et al.
2008/0305839 A1 12/2008 Karaoguz et al.
2009/0079263 A1 3/2009 Crumm et al.
2009/0091310 A1 4/2009 Levenson et al.
2009/0178740 A1 7/2009 Lenze et al.
2009/0222978 A1 9/2009 Fang
2009/0243390 A1 10/2009 Oto
2009/0271642 A1 10/2009 Cheng et al.
2010/0001689 A1 1/2010 Hultman et al.
2010/0076615 A1 3/2010 Daniel et al.
2010/0083413 A1 4/2010 Mcgovern
2010/0134077 A1 6/2010 Krajcovic
2010/0229286 A1 9/2010 Ahlgren et al.
2010/0280676 A1 11/2010 Pabon et al.
2011/0006603 A1 1/2011 Robinson et al.
2011/0007491 A1 1/2011 Robinson et al.
2011/0026282 A1 2/2011 Chapman et al.
2011/0031911 A1 2/2011 Marcinkiewicz et al.

(56) References Cited

U.S. PATENT DOCUMENTS

| | | | | |
|---|---|---|---|---|
| 2011/0031958 | A1 | 2/2011 | Wang | |
| 2011/0072548 | A1 | 3/2011 | Hersick et al. | |
| 2011/0094018 | A1 | 4/2011 | Rogers et al. | |
| 2011/0154619 | A1 | 6/2011 | Ward et al. | |
| 2011/0184585 | A1 | 7/2011 | Matsuda et al. | |
| 2011/0193416 | A1 | 8/2011 | Campanella et al. | |
| 2011/0198933 | A1 | 8/2011 | Ishigaki et al. | |
| 2011/0234000 | A1 | 9/2011 | Yan et al. | |
| 2011/0277222 | A1 | 11/2011 | Garneau et al. | |
| 2011/0278957 | A1 | 11/2011 | Eckhoff et al. | |
| 2012/0002046 | A1 | 1/2012 | Rapoport et al. | |
| 2012/0007432 | A1 | 1/2012 | Rice et al. | |
| 2012/0092903 | A1 | 4/2012 | Nania et al. | |
| 2012/0144565 | A1 | 6/2012 | Huh | |
| 2012/0144567 | A1 | 6/2012 | Huh | |
| 2012/0167281 | A1 | 7/2012 | Gennrich et al. | |
| 2012/0174294 | A1 | 7/2012 | Sackett | |
| 2012/0205976 | A1 | 8/2012 | Shih et al. | |
| 2012/0274800 | A1 | 11/2012 | Vakil | |
| 2012/0326516 | A1 | 12/2012 | Gurunathan et al. | |
| 2013/0000016 | A1 | 1/2013 | Hall et al. | |
| 2013/0043233 | A1* | 2/2013 | Elser | H05B 3/84 219/211 |
| 2013/0091623 | A1* | 4/2013 | McCulloch | A61F 9/025 2/435 |
| 2013/0163302 | A1 | 6/2013 | Li et al. | |
| 2013/0239303 | A1 | 9/2013 | Cotterman et al. | |
| 2013/0278216 | A1 | 10/2013 | Son et al. | |
| 2013/0293013 | A1 | 11/2013 | Templeton et al. | |
| 2013/0293452 | A1 | 11/2013 | Ricci et al. | |
| 2014/0091623 | A1 | 4/2014 | Shippy et al. | |
| 2014/0095915 | A1 | 4/2014 | Hitchcock et al. | |
| 2014/0097685 | A1 | 4/2014 | Jun et al. | |
| 2014/0103720 | A1 | 4/2014 | Robinson et al. | |
| 2014/0130241 | A1 | 5/2014 | Abdollahi et al. | |
| 2014/0184862 | A1 | 7/2014 | Schweng et al. | |
| 2014/0209377 | A1 | 7/2014 | Wang | |
| 2014/0240834 | A1 | 8/2014 | Mason | |
| 2014/0292081 | A1 | 10/2014 | Long et al. | |
| 2014/0312828 | A1 | 10/2014 | Vo et al. | |
| 2015/0121610 | A1* | 5/2015 | Cornelius | H05B 1/02 2/435 |
| 2015/0137606 | A1 | 5/2015 | Adest et al. | |
| 2015/0157079 | A1 | 6/2015 | Auranen et al. | |
| 2015/0237771 | A1 | 8/2015 | Natter et al. | |
| 2015/0246384 | A1 | 9/2015 | Ikeda et al. | |
| 2015/0302773 | A1 | 10/2015 | Stone et al. | |
| 2016/0018653 | A1 | 1/2016 | Haddick et al. | |
| 2016/0075338 | A1 | 3/2016 | Henn | |
| 2016/0094071 | A1 | 3/2016 | Nge et al. | |
| 2016/0171864 | A1 | 6/2016 | Ciaramelletti et al. | |
| 2016/0286156 | A1 | 9/2016 | Kovac | |
| 2016/0295948 | A1 | 10/2016 | Dowd et al. | |
| 2016/0329811 | A1 | 11/2016 | Du et al. | |
| 2016/0342186 | A1 | 11/2016 | Ragupathi et al. | |
| 2017/0027268 | A1 | 2/2017 | Folgar | |
| 2017/0077704 | A1 | 3/2017 | Faley et al. | |
| 2017/0089172 | A1 | 3/2017 | Zhao | |
| 2017/0269460 | A1 | 9/2017 | Fagerkvist | |
| 2017/0338665 | A1 | 11/2017 | Long et al. | |
| 2018/0003989 | A1 | 1/2018 | Terada et al. | |
| 2018/0235304 | A1 | 8/2018 | Fischer et al. | |
| 2018/0239144 | A1 | 8/2018 | Woods et al. | |
| 2018/0308397 | A1 | 10/2018 | Sugimoto et al. | |
| 2018/0325736 | A1 | 11/2018 | O'Malley et al. | |
| 2018/0353176 | A1 | 12/2018 | Shelton, IV et al. | |
| 2019/0101359 | A1 | 4/2019 | Zimmer | |
| 2019/0157885 | A1 | 5/2019 | Rippel et al. | |
| 2019/0206134 | A1 | 7/2019 | Devam et al. | |
| 2020/0008508 | A1 | 1/2020 | Havola | |
| 2020/0019236 | A1 | 1/2020 | Parkinson et al. | |
| 2020/0067786 | A1 | 2/2020 | Ricci | |
| 2020/0197997 | A1 | 6/2020 | Zhou et al. | |
| 2021/0037905 | A1 | 2/2021 | Ward et al. | |
| 2021/0247618 | A1 | 8/2021 | Moore et al. | |
| 2021/0335566 | A1 | 10/2021 | Smith | |
| 2021/0402731 | A1 | 12/2021 | Konyu et al. | |
| 2022/0071336 | A1 | 3/2022 | Franzino et al. | |
| 2022/0137389 | A1 | 5/2022 | Chen | |

FOREIGN PATENT DOCUMENTS

| | | | |
|---|---|---|---|
| CN | 109923500 | B | 1/2022 |
| DE | 630473 | A1 | 5/1936 |
| DE | 8138228 | A1 | 6/1983 |
| EP | 0335316 | A2 | 10/1989 |
| EP | 1966850 | A2 | 9/2008 |
| EP | 2230743 | A2 | 9/2010 |
| FR | 3095773 | A3 | 11/2020 |
| GB | 1114214 | A1 | 5/1968 |
| JP | 2019056915 | A2 | 4/2019 |
| WO | 2006126023 | A1 | 11/2006 |
| WO | 2007012785 | A1 | 2/2007 |
| WO | 2007048837 | A1 | 5/2007 |
| WO | 2007076440 | A2 | 7/2007 |
| WO | 2008072014 | A1 | 6/2008 |
| WO | 2008072015 | A1 | 6/2008 |
| WO | 2008090378 | A1 | 7/2008 |
| WO | 2011023678 | | 3/2011 |
| WO | 2011046645 | A1 | 4/2011 |
| WO | 2011113280 | A1 | 9/2011 |
| WO | 2012122315 | A1 | 9/2012 |
| WO | 2013083296 | A2 | 6/2013 |
| WO | 2014165469 | A1 | 10/2014 |
| WO | 2015051248 | A1 | 4/2015 |
| WO | 2016016445 | A1 | 2/2016 |
| WO | 2017087130 | A1 | 5/2017 |
| WO | 2018173313 | A1 | 9/2018 |
| WO | 2020109887 | A1 | 6/2020 |
| WO | 2020217089 | A1 | 10/2020 |
| WO | 2020237189 | A1 | 11/2020 |
| WO | 2022115531 | A1 | 6/2022 |

OTHER PUBLICATIONS

Abu-Qahouq, Jaber A., et al., Twenty-Fourth Annual IEEE Applied Power Electronics Conference and Exposition, Control Scheme for high-efficiency high-performance two-stage power converters, 2009, 7 pages.

Alibaba.com, 5KW charger controller for wind power supply and solar cell (2009) 3 pages.

Amazon.com: Morningstar TriStar-45 Solar Charge Controller for solar/wind generator/Wind Turbine-45 amps, 2009, 6 pages.

AU Examination Report No. 1 for Application No. 2014248342 dated Sep. 7, 2017, 3 pages.

AU Examination Report No. 1 for Application No. 2010307261 dated Jul. 23, 2013.

BA 5590 Lithium Battery, http://defense-update.com/products/b/ba5590.htm, Jul. 26, 2006, 1 page.

Battery Management Systems (BMS), 2009, www.mpoweruk.com/bms.htm. 12 pages.

Becherif, M., et al., Vehicle power and propulsion conference (VPPC), 2010 IEEE, IEEE Power and Propulsion Conference (VPPC), Advantages of variable DC bus voltage for hybrid electrical vehicle, 2010, pp. 1-6.

Bruce, et al., www.rfdesign.com, Defense Electronics, Military takes aim at high battery costs, Apr. 2005, pp. 20-25.

Button, Robert M., Nasa/TM-2002-211370, Intelligent Systems for Power Management and Distribution, Feb. 2002, 12 pages.

CA Office Action corresponding to Application No. 3,138,704, dated Jan. 22, 2022, 5 pages.

Cipriano, Greg, et al., Protonex, Joint Service Power Expo, 2009, 38 pages.

Conti, M., et al., SystemC modeling of a dynamic power management architecture, 6 pages.

Dirjish, Mat, http://electronicdesign.com/IArticles/Index.cfm?AD=1&ArticlesID-19515; Engineer seeks cure for common wall warts, Aug. 2008, 3 pages.

Duarte, Jorge L., et al., IEEE Transactions on Power Electronics, Three-Port Bidirectional converter for hybrid fuel cell systems, 2007, vol. 22, No. 2, 8 pages.

(56) References Cited

OTHER PUBLICATIONS

EP Search Report corresponding to Application 14780196.3 dated Dec. 9, 2016, 11 pages.
EP Search Report corresponding to Application No. 16866830.9 dated Mar. 1, 2019, 9 pages.
EP Search Report corresponding to Application No. 20808866.6, dated May 3, 2022, 25 pages.
Evans, Ian C. et al., IEEE electric ship technologies symposium, High power clean dc bus generation using ac-link ac to dc power voltage conversion, de regulation, and galvanic isolation, 2009, 12 pages.
EP Extended Search Report corresponding to Application No. 22 18 9026, dated Jan. 23, 2023, 7 pages.
Fursin, Leonid, et al,, Development of compact variable-voltage, bi-directional 100kw dc-dc converter, 2007, 9 pages.
Garcia, Julio, et al, 2009 Barcelona Forum on Ph.D. Research in Electronic Engineering, Efficiency improvements in autonomous electric vehicles using dynamic commutation of energy resources, 2009, 2 pages.
Green Plug, www.greenplug.us, One plug one planet, 2009, 7 pages.
Green plug partners with wipower for advanced wireless power systems (2009) http://green.tmcnet.com/topics/green/articles/57729-green-plug-partners-with-wipower-advanced-wireless-power.htm 3 pages.
Hoffart, Fran, New charger topology maximizes battery charging speed, 1998, 2 pages.
Hong, Inki, et al., IEEE Transactions on computer-aided design of integrated circuits and systems, Power Optimization of variable-voltage core-based systems, Dec. 1999, vol. 18, No. 12, 13 pages.
International Search Report and Written Opinion corresponding to Application No. PCT/US2020/033207, dated Jul. 30, 2020, 17 pages.
International Search Report and Written Opinion corresponding to Application No. PCT/JP2008/066605, dated Dec. 16, 2008, 11 pages (English translation attached).
International Search Report and Written Opinion corresponding to Application No. PCT/US2010/41335, dated Mar. 24, 2011, 11 pages.
International Search Report and Written Opinion corresponding to Application No. PCT/US2016/058922, dated Feb. 9, 2017, 6 pages.
International Search Report and Written Opinion corresponding to Application No. PCTUS2014/032455, dated Sep. 8, 2014, 12 pages.
International Search Report and Written Opinion corresponding to Application PCT/US2016/062863, dated Mar. 30, 2017, 6 pages.
Karlsson, et al., IEEE Transactions on power electronics, DC bus voltage control for a distributed power system, Nov. 2003, vol. 18, No. 6, pp. 1405-1412.
Khan,F.H., et al., www.ietdl.org, IET Power Electronics, Bi-directional power manager management and fault tolerant feature in a-5KW multivlevel dc-dc converter with modular architecture, 2009, vol. 2, No. 5, pp. 595-604.
Kriechenbauer et al., Deep drawing with superimposed low-frequency vibrations on servo-screw presses, 11th International Conference on Technology of Plasticity, ICTP 2014, (Oct. 19-24, 2014) Nagoya Congress Center, Nagoya, Japan, Procedia Engineering vol. 81, 2014, pp. 905-913.
Lu et al., A Novel Surface Texture Shape for Directional Friction Control, Tribology Letters, 2018, vol. 66, No. 51, 13 pages.
Merkle, Matthew Alan, Thesis submitted to the faculty of Virginia Polytechnic Institute and State University Variable bus voltage modeling for series hybrid electric vehicle simulation, Dec. 1997, 33 pages.
Nihon Kohden: Products-Monitoring, Smart Cable Technology,www.nkusa.com/prod-monitor-smart-cable.htm, 1 page.
Ocean Server Technology, Inc., Intelligent Battery and Power System, May 2008, 4 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Patel et al., "Parametric Analysis of Deep Drawing Process for Hemisphere Dome Shape of Steel AISI 1023" Journal of Basic and Applied Engineering Research, vol. 1, No. 2, Oct. 2014, pp. 9-16.
Podesser, Peter www.mil-embedded.com/articies/id/?3966, Portable power management for soldiers; Fuel cell hybrid system is lighter, safer, May 2009, 7 pages.
Reuters, Protonex to Launch Soldier-Worn Portable Power Management Systems, Feb. 2009, http://www.reuters.com/article/idUS159777+17-Feb-2009+BW20090217ttcp8McGk2XDy11b8d.97.
Reyneri, et al., IAC-09.C3.2.8, A redundant power bus for distributed power management for a modular satellite, 2009,8 pages.
Rothman, Wilson, gizmodo.com/295076/new-Honeywell-hdmi-cable-heals-self-but-at-what-cost, New Honeywell HDMI Cables Heals Self, But At What Cost?, Aug. 2007, 3 pages.
SFC Energy, Press release: SFC receives commercial order for portable fuel cells, Feb. 11, 2008, www.sfc.com/index2.php option=com_pressreleasees&Itemid=467&id=1050&lang=en&pop-1&page=0; 1 page.
SFC Smart Fuel Cell Launches Joint Power Manager, Jun. 2009, http:/fuelcellsworks.com/news/2009/06/04/sfc-smart-fuel-cell-launches-joint-power-manager, 4 pages.
SFC, The SFC Power Manager—The technology (2009) http://web.archive.org/web/20090312005238/http:/www.sfc.com/en/man-portable-technology-power-manager.html, 2pgs.
EP Extended Search Report corresponding to Application No. 21770744.7, dated Mar. 7, 2024, 7 pages.
EP Supplementary Search Report corresponding to Application No. 21770744, dated Feb. 27, 2024, 2 pages.
International Search Report and Written Opinion corresponding to Application No. PCT/US2024/027730, dated Jul. 9, 2024, 17 pages.
Singh, et al, Conference Record of the Twenty-Eighth IEEE Photovoltaic Specialists Conference, Fuzzy Logic-based Solar Charge Controller for Microbatteries, 2000, pp. 1726-1729.
CA Examiner's Report corresponding to Application No. 3,167,174, dated Oct. 19, 2023, 6 pages (English Translation).
EP Extended Search Report corresponding to Application No. 23165534.1, dated Aug. 9, 2023, 10 pages.
Richter, Wolfgang, Chip for saving power, Aug. 2007, 2 pages.
International Search Report and Written Opinion corresponding to International Application No. PCT/US2022/28754, dated Aug. 29, 2022, 12 pages.
Dangora, Lisa M., et al., "Deep-Drawing Forming Trials on a Cross-Ply Thermoplastic Lamina for Helmet Preform Manufacture" Journal of Manufacturing Science and Engineering (Mar. 2017) vol. 139, 8 pages.
International Preliminary Report on Patentability issued in International Patent Application No. PCT/US2021/016807, issued on Jul. 28, 2022, 8 pages.
International Search Report and Written Opinion issued in International Patent Application No. PCT/IB2013/003041, mailed on Feb. 9, 2015, 12 pages.
Kriechenbauer, Sebastian, et al., "Deep drawing with superimposed low-frequency vibrations on servo-screw presses" 11th International Conference on Technology of Plasticity, ICTP 2014, Oct. 19-24, 2014, Nagoya Congress Center, Nagoya, Japan, Procedia Engineering vol. 81, pp. 905-913.
Lu, Ping, et al., "A Novel Surface Texture Shape for Directional Friction Control" Tribology Letters (2018) vol. 66, No. 51, 13 pages.
Patel, Nikunj D., et al., "Parametric Analysis of Deep Drawing Process for Hemisphere Dome Shape of Steel AISI 1023" Journal of Basic and Applied Engineering Research, Oct. 2014, vol. 1, No. 2, pp. 9-16.
International Search Report and Written Opinion issued in corresponding international patent application No. PCT/US2021/016807, mailed Dec. 28, 2021.
International Search Report and Written Opinion corresponding to International Application No. PCT/US2022/028754, dated Aug. 29, 2022, 12 pages.
EP Extended Search Report in Application No. 22209825.3, dated Apr. 13, 2023, 4 pages.

(56) References Cited

OTHER PUBLICATIONS

International Search Report and Written Opinion in corresponding application No. PCT/US2023/61745, dated Jul. 28, 2023, 19 pages.

* cited by examiner

ANTI-FOGGING OPTICAL LENS AND SYSTEM

1 CROSS REFERENCE TO RELATED U.S. PATENT APPLICATIONS

This application claims priority to U.S. Patent Application No. 63/326,029, filed on Mar. 31, 2022 entitled ANTI-FOGGING OPTICAL LENS AND SYSTEM, the entire disclosure of which is incorporated herein by reference for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2022-2023, Galvion, LTD, Portsmouth, NH.

3 BACKGROUND OF THE DISCLOSURE

3.1 Field of the Disclosure

The subject disclosure is directed to anti-fog lenses, and more particularly to systems, software, and methods for clearing condensed vapor from eyewear lenses.

3.2 The Related Art

Eyewear lenses are known to fog under cold and/or humid conditions. Water vapor condenses on a portion of a lens that is colder than moisture-bearing air that is in contact with the lens. Condensation can form, for example, on an inner surface of eyewear that is exposed to air that has been warmed and humidified by a user's body heat, moisture released from the skin, or by respiration when the lens is at a lower temperature than the warmed and humidified air; for example, when an outer surface of the lens is exposed to a relatively cool environment. It is desirable to remove condensed moisture from the lens without removing and wiping the eyewear or lens.

Known systems include optically transparent or minimally opaque heating elements such as fine wires and electrically resistive coatings through which electric current is passed for electrically resistive heating to increase a temperature of a lens and thereby dissipate condensed moisture from the lens.

Known systems have been optimized to reduce, during operation, the presence of hot spots in the heating elements and to evenly heat lenses; for example, known systems are configured to ensure that a whole lens is cleared of condensed moisture in a uniform manner.

4 SUMMARY OF THE DISCLOSURE

One problem with conventional systems is that they are designed to distribute current, and to generate heat in an electrically conductive layer of a lens, in a uniform manner across the lens. The inventors have recognized that the distributed heating of lenses provided by known systems, i.e. evenly heating a substantial portion of a lens, engenders relatively slow clearing of condensed vapor or fog from the lens.

The inventors have further recognized that preferentially heating a selected portion of a lens, and in particular a selected portion of the lens positioned in front a user's eyes, enables more rapid clearing of fog from the selected portion, thereby enabling preferential clearing of fog that would otherwise block a user's line of sight.

The present disclosure is directed to embodiments of an active anti-fog (AAF) lens that is configured to actively clear condensed water from a lens, as well as eyewear that includes one or more AAF lenses. An active anti-fog (AAF) lens according to the technology described herein, when operated, clears condensation from the lens more rapidly than known anti-fog lenses. In addition, embodiments of the AAF lens are configured to preferentially heat an area of the lens disposed in front of a user's eyes to rapidly clear condensation from that area of the lens and to further maintain at least the area of the lens disposed in front of the user's eyes clear of condensation. This advantageously provides increased situational awareness for the user compared to known systems by providing and maintaining a clear line of sight for the user.

An AAF lens according to the subject technology is usable as a lens component of one or more types of eyewear including, for example, a helmet-mounted visor, a face shield, spectacles, and goggles and can be mounted in a lens holder of these and other types of eyewear.

The technology described herein includes an active anti-fog system that includes an AAF lens as well as a power and control system for powering the AAF lens and for controlling power provided to the AAF lens.

Embodiments of the subject technology are configured to provide initial rapid heating of a selected portion of an exemplary AAF lens, thereby enabling rapid clearing of the selected portion of the AAF lens. A particular embodiment of an exemplary AAF lens is configured for preferentially clearing a portion of the AAF lens that is disposed directly in front of a user's eye when the user is wearing the lens.

In at least one aspect, the subject technology relates to a helmet system that includes a helmet and a lens that is attached to the helmet. The lens includes a conductive layer. The conductive layer is configured to receive electrical current. The lens includes at least one region that, in response to the conductive layer receiving electrical current, generates heat faster than other regions of the conductive layer. The at least one region that generates heat faster than other regions is positioned corresponding to eye positions of a wearer of the helmet.

In some embodiments, the helmet system includes a first electrode that is located proximal to a top edge of the lens and that is in electrical communication with the conductive layer, a second electrode that is located proximal to the top edge of the lens and that is in electrical communication with the conductive layer, and a power source that is in communication with both of the first and second electrodes and is configured to provide electrical current through the conductive layer.

In at least one aspect, the subject technology relates to an AAF eyewear system that includes a lens holder, an AAF lens, with a conductive layer, that is attachable to the lens holder, and a power supply that is in electrical communication with the conductive layer. The lens holder is configurable to dispose the AAF lens in front of the eyes of a user of the AAF eyewear system with a first portion of the lens disposed in a line of sight of the user. When the power supply provides an electric current to the conductive layer, the first region of the AAF lens generates heat more rapidly than other regions of the AAF lens.

In some embodiments, the AAF lens is removably attachable to the lens holder.

In some embodiments, the lens holder is mountable on a helmet. When the lens holder is mounted on the helmet and a user wears the helmet, the lens holder is configurable to dispose the attached AAF lens in front of eyes of the user, with the first region of the lens positioned along a line of sight of the user.

In some embodiments, when the power supply provides an electric current to the conductive layer, condensed fog is cleared from first region of the lens in 120 seconds or less when tested according to a Natick Soldier Research, Development, and Engineering Center (NSRDEC) Fog Tester protocol.

In some embodiments, the AAF eyewear system includes a first electrode disposed proximal to a top edge of the lens, in electrical communication with the conductive layer, and a second electrode disposed proximal to the top edge of the lens, in electrical communication with the conductive layer. In some embodiments, the first region of the lens is disposed between the first electrode and the second electrode.

In at least one aspect, the subject technology relates to an AAF lens for eyewear that includes an optical lens. The optical lens has an inner surface that is proximal to a wearer when the eyewear is worn as well as an outer surface that opposes the inner surface. An electrically conductive layer is disposed on the inner surface of the optical lens. The AAF lens includes a first electrode disposed proximal to a top edge of the optical lens and a second electrode disposed proximal to the top edge of the optical lens. The first and second electrodes are in electrical communication with the electrically conductive layer. The AAF lens for eyewear also includes a power source in electrical communication with both the first electrode and the second electrode and configured to provide electrical current through the electrically conductive layer.

In some embodiments, the first electrode of the AAF lens is disposed proximal to a right edge of the lens and the second electrode is disposed proximal to a left edge of the lens.

In some embodiments, the AAF lens includes at least one functional layer disposed on the outer surface, the at least one functional layer comprising one or more of: a reflective coating; a hydrophobic coating; and a tint coating.

In some embodiments, the electrically conductive layer includes indium tin oxide (ITO).

In some embodiments, when an electrical current is supplied by the power source, at least a portion of the lens disposed between the two electrodes and extending towards a bottom edge of the lens is cleared of condensation in 120 seconds or less when tested according to a NSRDEC Fog Tester protocol.

In some embodiments, when an electrical current is supplied by the power source, a first portion of the lens corresponding to a line of sight of a user of the lens is cleared of condensation in 120 seconds or less when tested according to the NSRDEC Fog Tester protocol.

In some embodiments, when the AAF lens for eyewear is exposed to a fog environment for at least 10 minutes and an electrical signal is subsequently supplied by the power source, the lens is cleared of condensation in 120 seconds or less.

In some embodiments, the first electrode and the second electrode are each electrically connected to the electrically conductive layer and are each adhered to the optical lens with an electrically conductive adhesive.

In some embodiments, the power source is electrically connected to the first electrode at two or more locations on the first electrode and is electrically connected to the second electrode at two or more locations on the second electrode.

In some embodiments, the power source is electrically connected to the first electrode at three or more locations on the first electrode and is electrically connected to the second electrode at three or more locations on the second electrode.

In some embodiments, the AAF lens is disposed in a frame that encloses at least a portion of a top edge and of the optical lens and does not enclose the bottom edge of the lens. The frame covers the first and second electrodes and includes electrical contacts for electrically connecting with the first and second electrodes.

5 BRIEF DESCRIPTION OF THE DRAWINGS

In the accompanying drawings, reference characters refer to the same parts throughout the different views. The drawings are not necessarily to scale; emphasis has instead been placed upon illustrating the principles of the disclosure. The features of the present disclosure will best be understood from a detailed description of the subject technology and example embodiments thereof selected for the purposes of illustration and shown in the accompanying drawings.

Various embodiments are depicted in the accompanying drawings for illustrative purposes, and should in no way be interpreted as limiting the scope of the disclosures. In addition, various features of different disclosed embodiments can be combined to form additional embodiments, which are part of this disclosure. Any feature or structure can be removed or omitted. Throughout the drawings, reference numbers can be reused to indicate correspondence between reference elements.

6 DESCRIPTION OF SOME EMBODIMENTS OF THE DISCLOSURE

6.1 Item Number List

Figure 1:
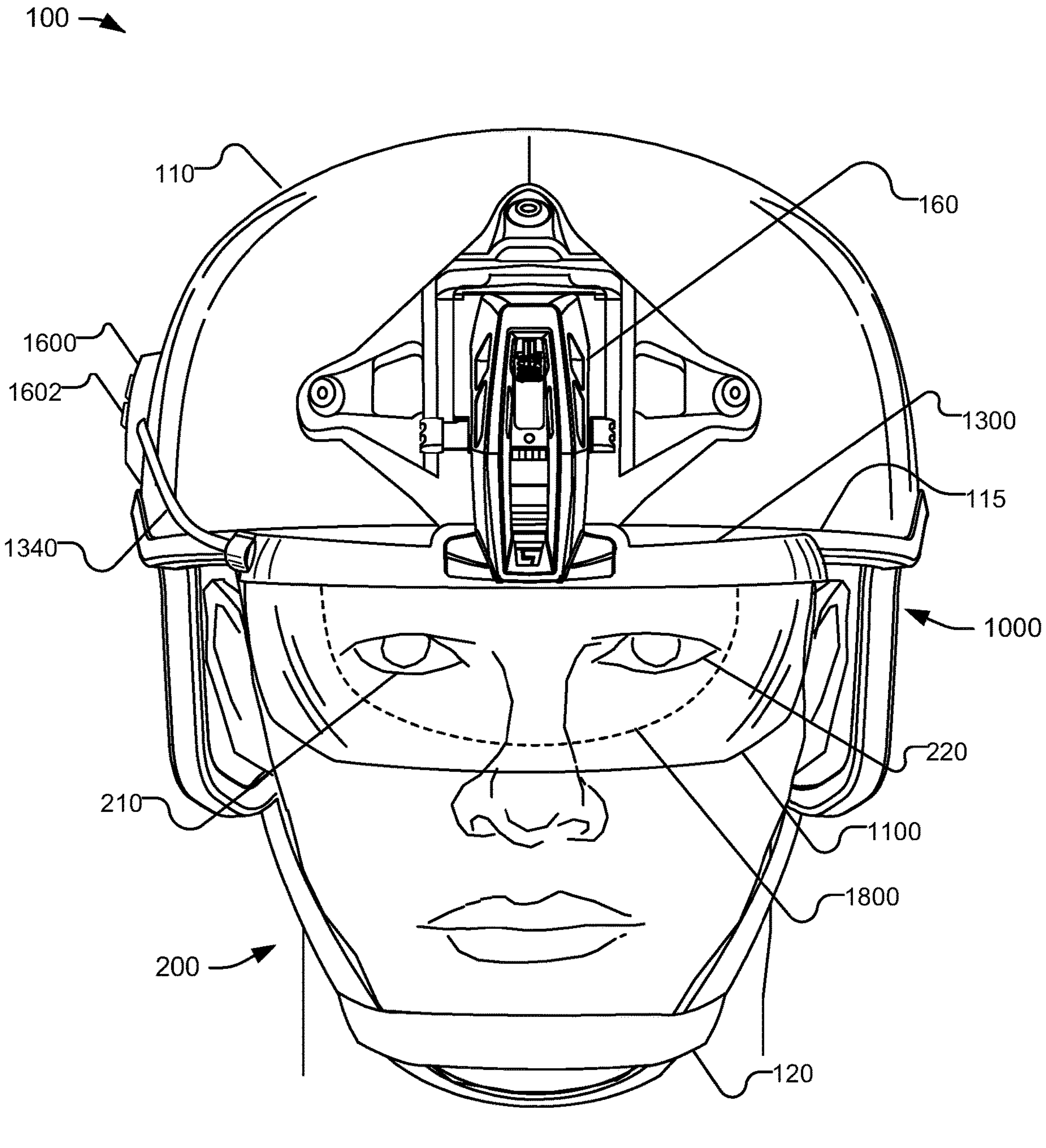
FIG. 1 is a front view of a helmet system that includes an active anti-fog (AAF) system including an AAF lens in accordance with the disclosed technology.

The following item numbers are used throughout, unless specifically indicated otherwise.

| # | DESCRIPTION |
|---|---|
| 100 | Helmet system |
| 110 | Helmet |
| 115 | Helmet rim |
| 120 | Retention system |
| 160 | Mounting arrangement |
| 170 | Display device |
| 200 | User |
| 210 | Right eye |
| 220 | Left eye |
| 1000 | First Active Anti-Fog (AAF) system |
| 1010 | Second AAF system |
| 1050 | Lens base |
| 1100 | First AAF lens |
| 1110 | Heater layer |
| 1120 | First (left) electrode |
| 1122 | Electrical contact |
| 1124 | Electrical contact |
| 1125 | Primary edge of first electrode |
| 1127 | Secondary edge of first electrode |
| 1128 | Adhesive |
| 1130 | Second (right) electrode |
| 1132 | Electrical contact |
| 1134 | Electrical contact |
| 1135 | Primary edge of second electrode |
| 1137 | Secondary edge of second electrode |
| 1138 | Adhesive |
| 1140 | Mounting boss |
| 1142 | Mounting feature |
| 1144 | Mounting feature |
| 1152 | Electrical wire |
| 1154 | Electrical wire |
| 1160 | First functional layer |
| 1162 | Second functional layer |
| 1170 | First masked area |
| 1172 | Second masked area |
| 1174 | Width of masked area |
| 1182 | Left edge of lens |
| 1184 | Right edge of lens |
| 1185 | Top left edge of lens |
| 1186 | Bottom edge of lens |
| 1187 | Top right edge of lens |
| 1190 | Inside surface of lens |
| 1191 | Inside surface of lens base |
| 1192 | Outer surface of lens |
| 1193 | Outer surface of lens base |
| 1200 | Second AAF lens |
| 1210 | Heater layer |
| 1220 | First (left) electrode |
| 1222 | Electrical contact |
| 1224 | Electrical contact |
| 1230 | Second (right) electrode |
| 1232 | Electrical contact |
| 1234 | Electrical contact |
| 1240 | Mounting boss |
| 1242 | Mounting feature |
| 1244 | Mounting feature |
| 1290 | Inside surface of lens |
| 1300 | First Frame |
| 1310 | Second Frame |
| 1312 | Lens receiving groove |
| 1314 | Bottom surface of frame |
| 1320 | Cable connector |
| 1322 | Electrical contact |
| 1324 | Electrical contact |
| 1332 | Electrical contact |
| 1334 | Electrical contact |
| 1340 | Cable |
| 1342 | Mounting feature |
| 1344 | Mounting feature |
| 1600 | Power and control system |
| 1602 | Control system button |
| 1610 | Controller |
| 1615 | Memory |
| 1630 | Power source |
| 1640 | Pulse width modulator (PWM) |
| 1650 | User interface (UI) |
| 1700 | Current paths |
| 1750 | Thermal image of lens |
| 1800 | First heated region |

-continued

| # | DESCRIPTION |
|---|---|
| 1805 | Unheated region |
| 1810 | First heated sub-region |
| 1820 | Second heated sub-region |
| 1830 | Third heated sub-region |
| 1840 | Fourth heated sub-region |
| 1850 | Fifth heated sub-region |
| 1860 | Sixth heated sub-region |
| 1900 | Defogging experimental results |
| 1910 | Galvion visor 1 results |
| 1920 | Galvion visor 2 results |
| 1930 | ABOM goggle results |
| 1940 | 0% haze threshold line |
| 1942 | 5% haze threshold line |
| 1950 | Test 1 start |
| 1952 | Test 1 stop |
| 1954 | Test 2 start |
| 1956 | Test 3 start |

6.2 Detailed Description of the Disclosure

The subject technology now will be described more fully hereinafter with reference to the accompanying drawings, in which illustrative embodiments of the disclosure are shown, and wherein like reference numerals are used to refer to like elements throughout. The disclosed technology may, however, be embodied in many different forms and should not be construed as limited to the embodiments set forth herein; rather, these embodiments are provided so that this disclosure will be thorough and complete, and will enable those skilled in the art to make and use the technology disclosed herein.

In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

As used herein, the term "and/or" includes any and all combinations of one or more of the associated listed items. Further, the singular forms of the articles "a," "an," and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence of addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Additionally, the word "exemplary" is used herein to mean "serving as an example, instance, or illustration." Any implementation described herein as "exemplary" is not necessarily to be construed as preferred or advantageous over other implementations.

Referring to FIG. 1, front view of a helmet system 100 worn on the head of a user 200 is shown. The user 200 has a right eye 210 and a left eye 220. The helmet system 100 includes a helmet 110 for protecting the user's head, for example, from impacts and ballistic projectiles, a retention system 120 attached to the helmet 110 for aiding in retaining the helmet 110 on the user's head, and a visor mounting arrangement 160. An exemplary visor mounting system 160 is disclosed in U.S. Pat. No. 10,542,787, which is incorporated herein by reference.

The helmet system 100 includes an embodiment of an active anti-fog (AAF) system 1000. The AAF system 1000 includes an AAF lens 1100 disposed in front of the eyes 210 and 220 of the user 200. The AAF lens 1100 is connected to a frame 1300 which holds and supports the AAF lens 1100. The frame 1300 is attached to the visor mounting arrangement 160 which together position and hold the AAF lens 1100 in front of the user's eyes 210, 220.

In some embodiments, the visor mounting arrangement 160 includes an adjustment means that allows the user to move the AAF lens 1100 between a position in front of the user's eyes, within the user's line of sight, and a position out of the user's line of sight, for example above a rim 115 of the helmet 110, as is known in the art. On other embodiments, the AAF lens 1100 is held in a fixed position relative to the user's eyes.

Although a particular visor mounting arrangement 160 and frame 1300 are shown, any suitable mounting arrangement and frame may be used to hold and position the AAF lens 1100 without departing from the subject technology. In addition, AAF lenses having different shapes and configurations can be substituted for AAF lens 1100 without departing from the subject technology. Example alternative embodiments of AAF lens 1100 include a lens for independently worn eyewear, for example, goggles or a face mask held in place by a strap arrangement or a pair of glasses.

In an exemplary embodiment, the power and control system 1600 includes one or more buttons 1602 or other operable controls for controlling at least some functions of the AAF system 1000.

The power and control system 1600 is attached to a side of the helmet. Alternatively, the power and control system 1600 may be mounted on another portion of the helmet, for example, on the rear of the helmet. In still further embodiments, the power and control system 1600 may comprise multiple interconnected components mounted in different locations; for example, a user interface (UI) component mounted on a side of the helmet near the front and the remainder of the power and control system mounted on the back of the helmet. Alternatively, the power and control system 1600 may be mounted off the helmet; for example, on a garment or on a piece of equipment worn or carried by the user, and attached to the helmet by a wired or wireless connection. In these embodiments, at least a portion of the power and control system 1600 can include an end user device (EUD) carried by a user. For example, an EUD can provide a UI for the power and control system 1600. The power and control system 1600 can operate with, or may comprise a portion of, one or more other control and/or power systems (not shown) of the helmet system 100.

The AAF system 1000 includes a cable 1340 connected to the frame 1300 and to a power and control system 1600 for providing exchange of electrical power, and in some embodiments communication signals, therebetween. In alternative embodiments (not shown) the frame 1300 may communicate with the power and control system over a wireless network. The cable 1340 includes one or more electrical conductors for carrying electrical, and in some embodiments, communication signals between the frame 1300 and the power and control system. In a particular embodiment, the cable 1340 is configured for communication of electrical power signals to the frame 1300 which in turn communicates the electrical power signals to electrical contacts on the AAF lens 1100. In alternate embodiments (not shown) the frame 1300 includes a built-in power and control system, in which case the AAF system 1000 may not include a cable 1340.

The AAF lens 1100 is operable to generate heat. For example, the AAF lens 1100 receives electrical power signals from the power and control system, through the cable 1340 and the frame 1300, and generates heat based on the electrical power signals.

In a particular embodiment, the lens 1100 is operable to rapidly generate heat in a first heated area 1800, which is disposed in front of the eyes 210, 220 of the user. In this manner, the first heated region 1800 is generated by the lens 1100 in a forward facing line of sight of the user. A temperature of the first heated region 1800 is increased to a magnitude where fog is cleared from the first heated region 1800, for example to a temperature greater than a local dew point temperature, before other regions of the AAF lens 1100 are heated. In operation, the first heated region 1800 is preferentially and rapidly cleared of condensed water vapor due to the preferential heating of the first heated region 1800. In this manner, the portion of the AAF lens within the user's line of sight is rapidly cleared and is maintained clear of visual obstruction due to condensed water vapor, which is advantageous to maintaining the user's situational awareness.

Figure 2:
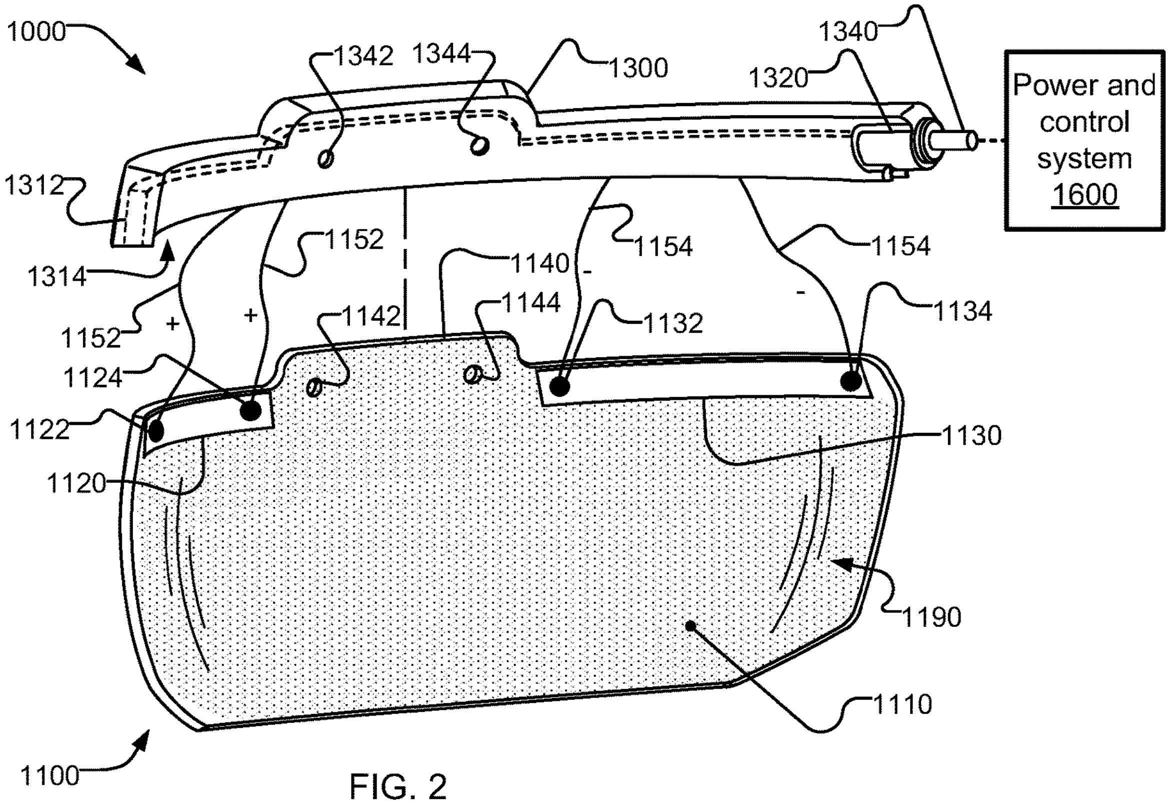
FIG. 2 is a rear perspective view of a first embodiment of the AAF system of FIG. 1.

FIG. 2 shows a rear exploded view of the AAF system 1000 shown in FIG. 1. The power and control system 1600 is illustrated in schematic form and cable 1340 is illustrated in partial schematic form.

The frame 1300 includes a cable connector 1320 that provides at least an electrical connection between the frame 1300 and the cable 1340. The cable connector 1320 can also include one or more communication connections between the frame 1300 and the cable 1340.

The frame 1300 includes a groove 1312, or other partially opened cavity, that extends along and opens onto a bottom surface 1314 of the frame 1300. The groove 1312 is shown in dashed phantom lines to indicate that it is located beneath the outer surfaces of the frame 1300, i.e. that it is an internal feature of the frame 1300. The groove 1312 is configured to hold and cover at least a portion of the top edge of the AAF lens 1100 when the AAF lens is assembled onto the frame 1300. The frame 1300 includes mounting features 1342 and 1344 to enable attaching the AAF lens 1100 to the frame when a top portion of the AAF lens is seated in the groove 1312.

Referring now to FIGS. 1 and 2, the frame 1300 includes one or more connecting features (not shown) for attaching the frame 1300 to a visor mounting feature 160.

Referring once more to FIG. 2, the AAF lens 1100 includes a mounting boss 1140 for interfacing with groove 1312 and multiple mounting features 1142 and 1144 to enable attaching the AAF lens 1100 to the frame 1300. In an exemplary embodiment, when the AAF lens 1100 is assembled onto the frame 1300, the lens mounting features 1142, 1144 are aligned with frame mounting features 1342, 1344, enabling assembly of an attachment device (not shown) between the AAF lens 1100 and the frame 1300, thereby attaching the AAF lens 1100 to the frame 1300. When the AAF lens 1100 is assembled with the frame 1300, the frame is attached to the top edge of the AAF lens at least at each of the mounting features 1342, 1344. The AAF lens 1100 is attached to the frame 1300 using any suitable attachment hardware; for example, screws, bolts, pins, or rivets. In embodiments, the AAF lens 1100 can be attached to the frame 1300 using one or more of attachment hardware, an adhesive bond, a clip, or any other suitable connector.

The AAF lens includes an electrically conductive layer, heater layer 1110, disposed on an inner surface 1190 of the AAF lens 1100. It is noted that the inner surface 1190 of the AAF lens faces a user when a helmet system, visor, goggle, spectacles, or the like that includes or holds the AAF lens 1100 are worn by a user. The heater layer 1110 can include one or more optically clear materials that are electrically conductive and that undergo electrically resistive heating when an electric current is passed through the heater layer 1110. An exemplary heater layer 1110 is formed from an indium oxide/tin oxide (ITO) material. In some embodiments, the heater layer 1110 is formed using one or more other materials in addition to or instead of ITO. Example embodiments of the heater layer 1110 may include one or more of electrically conductive metallic (e.g. silver) nanowires, carbon nanotubes, ZnO (zinc oxide), IZO (indium oxide/zinc oxide), AZO (zinc oxide/aluminum oxide), GZO (zinc oxide/gallium oxide), Au (gold), or the like.

Optionally, the AAF lens 1100 includes one or more functional layers. For example, a tint layer or a hydrophobic layer may be disposed on one or both of the outer and inner surface of the AAF lens, wherein the outer surface opposes the inner surface 1190.

The AAF lens 1100 includes a first electrode 1120 and a second electrode 1130, each of which are attached to the AAF lens 1100. Each electrode 1120, 1130 is electrically connected with the heater layer 1110. In an exemplary embodiment, the electrodes 1120, 1130 are attached to the AAF lens 1100 using an electrically conductive adhesive. The electrically conductive adhesive adheres the electrodes to the AAF lens and provides an electrical connection between each electrode and the heater layer 1110.

Two electrical contacts, 1122 and 1124 are disposed on the first electrode 1120 and two electrical contacts 1132 and 1134 are disposed on the second electrode 1130. In alternative or additional embodiments (not shown) different numbers of electrical contacts are disposed on each electrode; for example, in some embodiments, 3, 4, or 5 electrical contacts are disposed on each electrode 1120, 1130.

A separate first wire lead 1152 is electrically connected to each electrical contact 1122, 1124 of the first electrode 1120. A separate second wire lead 1154 is electrically connected to each electrical contact 1132, 1134 of the second electrode. In an example embodiment, the wire leads 1152, 1154 are soldered onto each electrical contact 1122, 1124, 1132, and 1134. The wire leads 1152, 1154 provide electrical communication between the electrodes 1120, 1130 and the power and communication system 1600. In the illustrated embodiment, the first electrode 1120 is a positive electrode and the second electrode 1130 is a negative electrode. The first wire leads 1152 are in electrical communication with a positive terminal of a power source while the second wire leads 1154 are in electrical communication with a negative terminal of the power source, for example, with a DC power source. In alternative embodiments, the first electrode 1120 is a negative electrode and the second electrode 1130 is a positive electrode.

When the frame 1300 and AAF lens 1100 are assembled together, a top portion of the AAF lens 1100, including the electrodes 1120, 1130 and electrical contacts 1122, 1124, 1132, 1134, are disposed in the groove 1312 and covered by the frame 1300. The wire leads 1152, 1154 are also enclosed by the frame 1300 and are electrically connected within the frame 1300 to the cable 1340 through the cable connector 1320. The cable 1340 extends from the cable connector 1320 to the power and control system 1600 to electrically connect the electrodes 1320, 1330 to the power and control system. In some embodiments, the cable 1340 includes one or more communication connections between the frame 1300 and the power and control system 1600.

In some exemplary embodiments, the AAF lens 1100 can be removed from the frame 1300, for example by loosening or removing attachment hardware. The same or a different AAF lens may be mounted on the frame, or a non-AAF lens may be mounted on the frame. This advantageously allows a user to remove and replace a damaged AAF lens 1100 or to replace a lens having first characteristics with a lens having second characteristics. For example, a user may remove an AAF lens 1100 that includes an optional tint layer and replace the tinted AAF lens 1100 with a clear AAF lens 1100.

Figure 3:
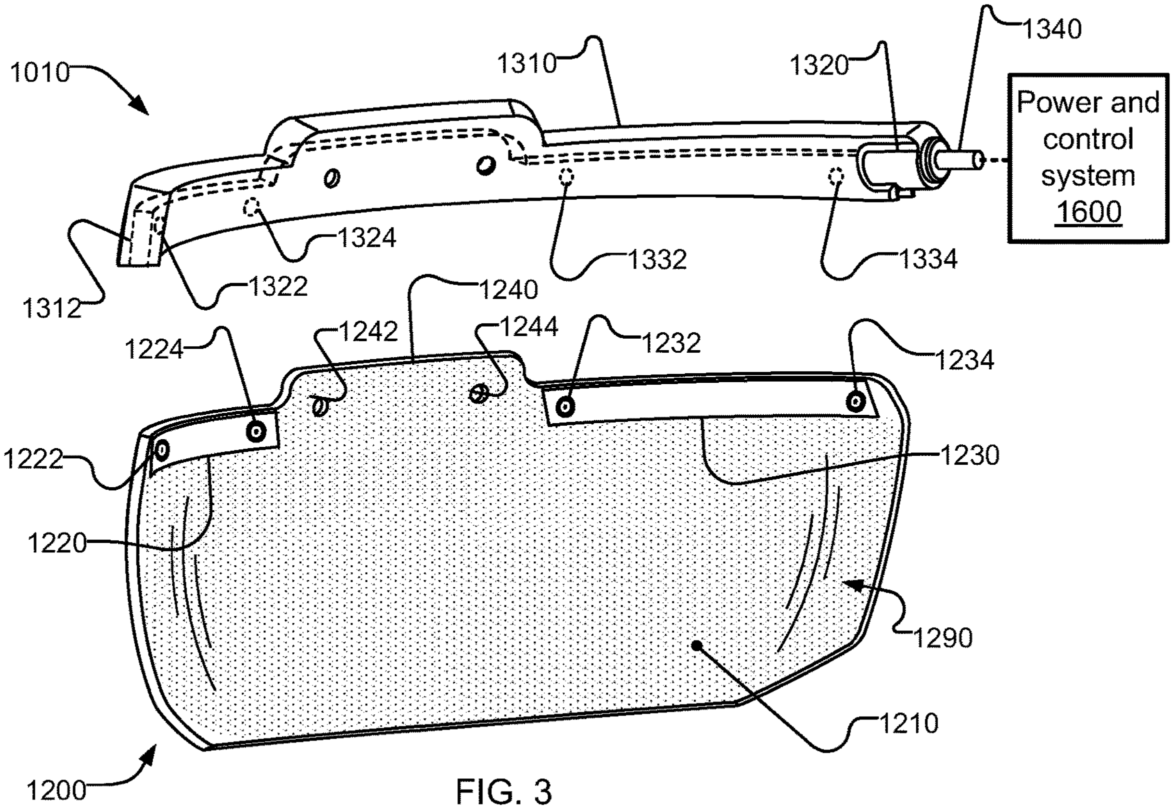
FIG. 3 is a rear perspective view of a second embodiment of the AAF system of FIG. 1.

FIG. 3 shows a rear exploded view of a second embodiment of an AAF system 1010. Referring now to FIGS. 2 and 3, the AAF system 1010 is similar to AAF system 1000, wherein like parts are given like reference numbers. The AAF system 1010 includes a frame 1310, an AAF lens 1200, cable 1340, and a power and control system 1600.

The frame 1310 and AAF lens 1200 are substantially similar to frame 1300 and AAF lens 1100. AAF lens 1200 includes a heater layer 1210 disposed on inner surface 1290 and electrodes 1220 and 1230. However, instead of wire leads connecting the electrodes 1220 and 1230 to the power and control system 1600, the electrodes 1220 and 1230 include electrical contacts 1222, 1224 and 1232, 1234 that are configured to interface with matching electrical contacts 1322, 1324 and 1332, 1334 that are disposed with the groove 1312 of the frame 1310. The electrical contacts 1222, 1224 and 1232, 1234 on the AAF lens 1200 may be configured to electrically connect with corresponding elastically deformable electrical contacts, for example with spring-loaded pins, spring-loaded electrical contacts, spring probes, or pogo pin style contacts 1322, 1324 and 1332, 1334 that are disposed within the groove 1312 of the frame 1310. Alternatively, the AAF lens 1200 may include elastically deformable electrical contacts configured to electrically connect with corresponding electrical contacts on the frame 1310. In still further embodiments, one or both of the AAF lens 1200 and frame 1310 may include plastically deformable electrical contacts or electrical contact that include a non-deformable mechanical interface, for example pins connectors that mate with corresponding receptacles.

Electrical contacts 1322, 1324 and 1332, 1334 of the frame 1310 are electrically connected, via the cable 1340, to the power and control system 1600 and thereby electrically connect the electrodes 1220 and 1230 to the power and control system 1600 when electrically connected to electrical contacts 1222, 1224 and 1232, 1234 of the AAF lens 1200. The use of pogo pin style connectors or the like is advantageous in that in enables simplified assembly of the AAF lens 1200 with the frame 1300, and simplified removal of the AAF lens from the frame.

6.2.1 Exemplary Method for Forming an AAF Lens

Figure 4A:
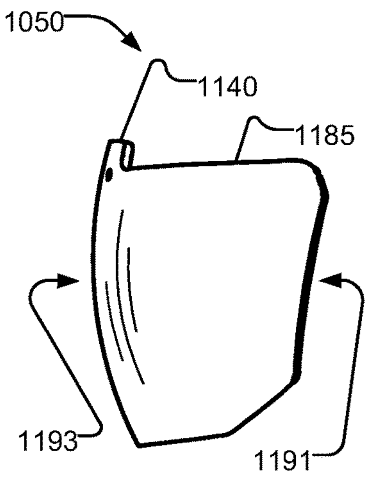
FIG. 4A is a side view of an uncoated lens base component of the AAF lens of FIG. 2.
Figure 4B:
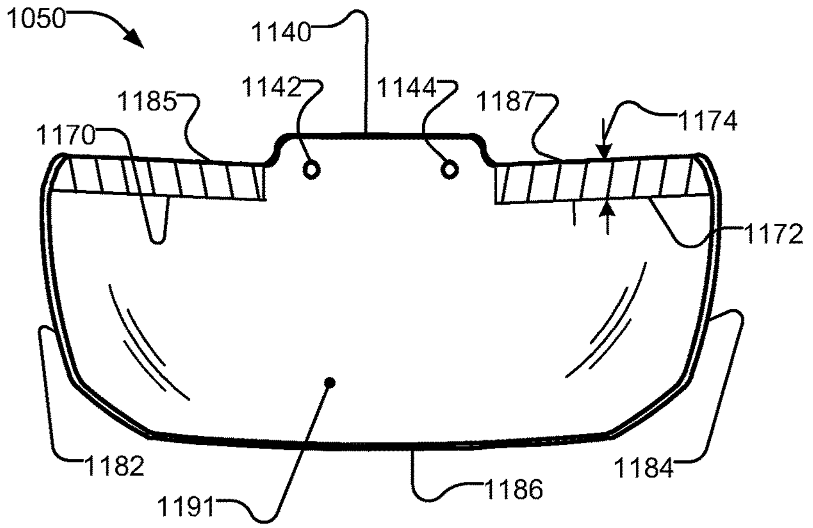
FIG. 4B is a rear view of the uncoated lens base component of FIG. 4A.
Figure 5:
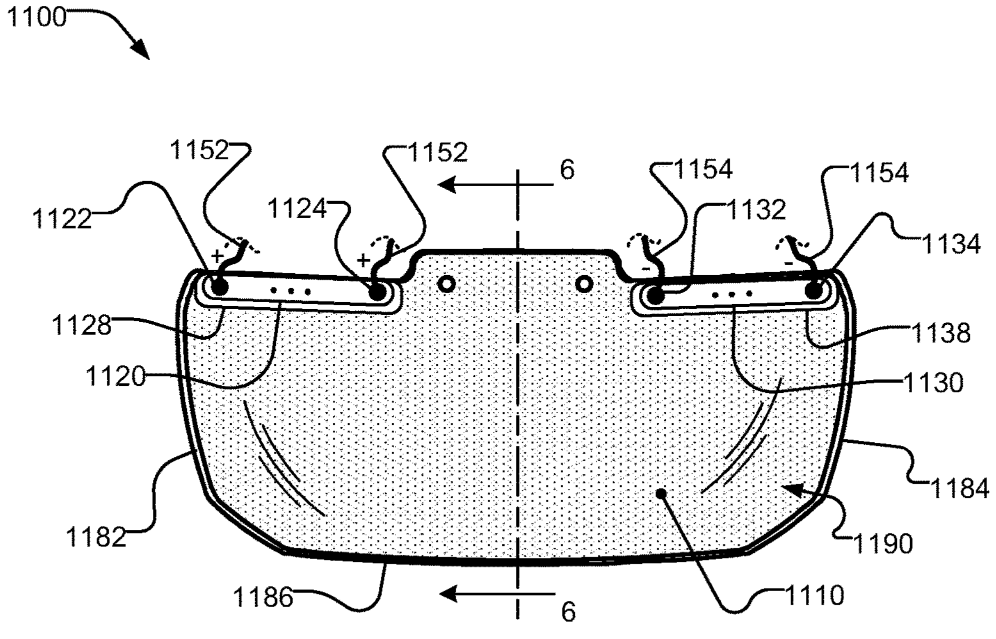
FIG. 5 is a rear view of the AAF lens of FIG. 2.
Figure 6:
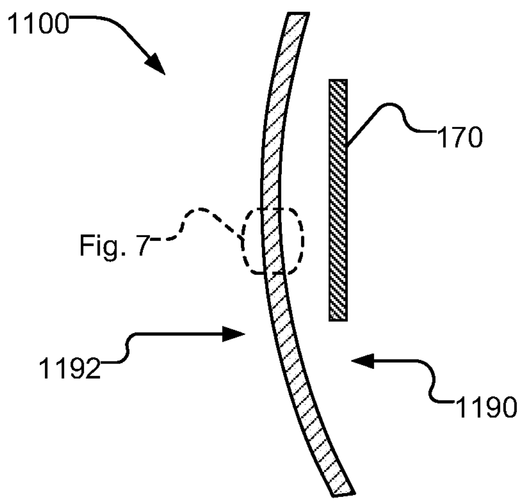
FIG. 6 is a cross section view of the AAF lens of FIG. 5, taken through section line 6-6 and includes a cross section view of a display screen.
Figure 7:
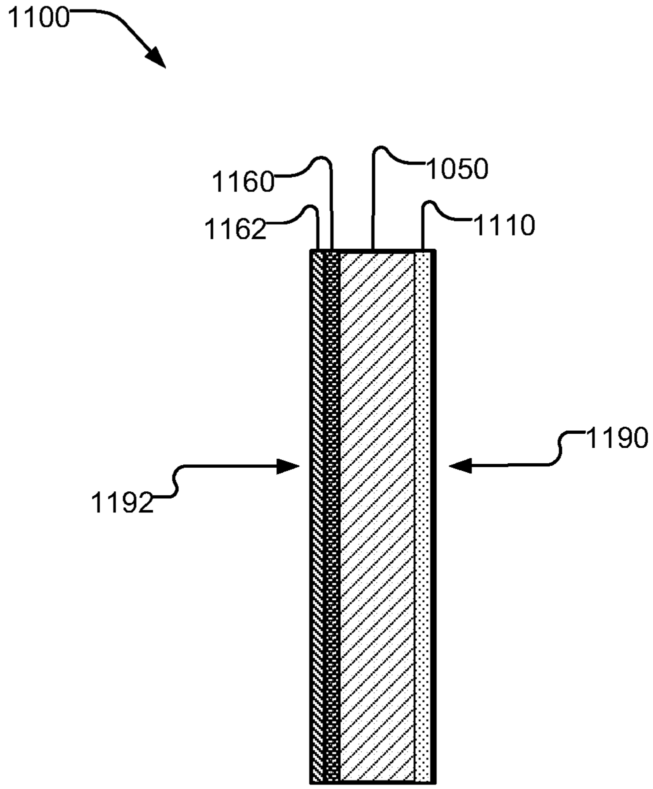
FIG. 7 is a detail view of the AAF lens of FIG. 6 at detail callout 7.

FIGS. 4A, 4B, 5, 6 and 7 together illustrate an exemplary method for forming an AAF lens 1100 in accordance with the disclosed technology. They also show an exemplary embodiment of an AAF lens 1100 formed according to the method of the technology. FIGS. 4A and 4B show an uncoated lens base 1050 while FIGS. 5, 6, and 7 show an AAF lens 1100 that has been formed using the uncoated lens base 1050 as a component of the AAF lens 1100.

Referring to FIGS. 4A and 4B, the uncoated lens base 1050 includes a left edge 1182, a right edge 1184, and a bottom edge 1186. The uncoated lens base 1050 also includes a mounting boss 1140 and two mounting features 1142 and 1144. The uncoated lens base 1050 further includes a left top edge 1185, disposed to the left of the mounting boss 1140, and a right top edge 1187, disposed to the right of the mounting boss 1140.

The uncoated lens includes an inner surface 1191 and an outer surface 1193. The inner surface 1191 faces a user's face when the lens is worn by the user as a component of eyewear. In the illustrated non-limiting example embodiment the lens includes a concave inner surface 1191 and a convex outer surface 1193. The lens curves from top to bottom and curves from left to right across the width of the lens. The uncoated lens base 1050 can be formed with other lens shapes. For example, the uncoated lens base 1050 can include a flat lens, a lens that curves from left to right but not from top to bottom, etc. without departing from the technology described herein.

The uncoated optical lens base 1050 is formed from a known optical lens material, for example, polycarbonate using a known lens forming process. The uncoated lens base 1050 can be formed using, for example, plastic materials, glass materials, and microcrystalline materials.

The uncoated lens base 1050 is shown prepared for application of materials for forming a heater layer 1110 on the uncoated lens base. A first masked area 1170 is disposed adjacent to the top left edge 1185, and extends approximately from a left side of the mounting boss 1140 toward the left edge 1182. A second masked area 1172 is disposed adjacent to the right top edge 1187 and extends approximately from a right side of the mounting boss 1140 toward the right edge 1184. The masked areas 1170 and 1172 extend downward from the top edges 1185, 1184 for a distance equal to a mask width 1174. An exemplary mask width is 7 mm. Masked areas can be formed with other mask widths and mask shapes, for example, based on a size and shape of an electrode to be included in an AAF lens.

Masked areas 1170 and 1172 are created by an operator on the inner surface 1191 of the uncoated lens base 1050 in preparation for application of a heater layer thereto. The masked areas 1170 and 1172 cover surface areas of the lens from which a heater layer will be excluded and where electrodes will be attached. In some embodiment, the mounting features 1142, 1144 and, optionally, a portion of the mounting boss 1140 are also masked.

The masked areas 1170, 1172 are created by disposing a masking material on the inner surface 1191 of the uncoated lens base 1050 at selected locations during a masking process step. The masking material prevents deposition of an applied heater layer on the masked areas. Masking materials include, for example, Kapton tape or any other suitable known masking material. After masked areas 1170 and 1172 have been created, one or more heater layer materials are disposed on the inner surface 1191 of the lens base 1050, thereby generating a heater layer 1110 on an inner surface 1190 of an AAF lens 1100. In alternate embodiments, masked areas may not be included on the uncoated lens base 1050. For example, masked areas may not be included when a pre-formed or screen printed heater layer will be applied to the lens or when portions of the lens will be cleared of a heater layer following attachment of the heater layer to the lens base 1050.

Referring now to FIGS. 4A and 5, a heater layer 1110 is disposed on the inner surface 1190 of AAF lens 1100 during a heater material coating process step. The heater layer 1110 is formed on the inner surface 1191 of the uncoated lens base 1050. An exemplary heater layer is formed from an ITO material or using one or more additional or alternative materials, as previously disclosed herein. In an exemplary embodiment, the ITO material may be deposited on the inner surface 1191 of the lens using any known method; for example, the ITO material may be deposited using laser chemical vapor deposition. Other suitable methods for disposing the heater layer 1110 on the lens include printing, sputter coating, and adhering a pre-formed layer to the inner surface 1191 of the lens base 1050.

In exemplary embodiments, the heater layer 1110 is formed with a sheet resistivity of approximately 50 ohms/sheet. In examples, a thickness of a heater layer 1110 is uniform within 1% across the coated surface across the AAF lens 1100. An exemplary heater layer 1110 has a visible light transmittance equal to or greater than 60%.

In an example embodiment, the heater layer 1110 covers the entire inner surface of the AAF lens 1110 except for locations corresponding to the first masked area 1170 and the second masked area 1172. In other embodiments (not shown), the heater layer 1110 may not cover the entire lens surface outside of the masked areas. For example, the heater layer 1110 may not cover the mounting boss 1140 and other portions of the lens that are designed to be covered by a mounting frame (e.g. referring to FIG. 2, by frame 1300), or other structures in which the lens is mounted; for example, in a mounting structure comprising goggles.

In further embodiments, the heater layer 1110 may be deposited on selected areas of the lens base 1050 using any suitable method; for example, the heater layer may be deposited by covering the entire interior surface 1191 of lens base 1050 with heater layer material and then removing the heater layer material from desired locations using, for example, an etching process. In other exemplary embodiments a preformed heater layer may be created and then disposed on the lens base 1050 wherein a preformed area of the heater layer is shaped to cover a desired area of the lens base 1050.

The masking material is removed following the heater material coating step, following which the first electrode 1120 and second electrode 1130 are each disposed on the AAF lens 1100 during an electrode adhesion process step. The electrodes 1120 and 1130 are disposed on the lens at the masked areas 1170 and 1172 after the masking material has been removed. The electrodes 1220 and 1230 are each in electrical communication with the heater layer 1110. The first electrode 1120 is located adjacent to the top left edge 1185 of the AAF lens 1100 and the second electrode 1130 is disposed adjacent to the top right edge 1187 of the AAF lens 1100. Both electrodes are disposed adjacent to the top edges 1185, 1187 of the lens. It is notable that the top edges of 1185 and 1187 of the lens are not opposed to each other; i.e. the top edges 1185 and 1187 are non-opposing edges of the AAF lens 1100. In alternative embodiments, an AAF lens may not include a mounting boss 1140, in which case the top left edge 1185 of the lens and the top right edge 1187 of the lens may be designated by their proximity to left edge 1182 and right edge 1184, respectively, with a boundary between the two top edges 1185 and 1187 designated by a midpoint between the left and right edges 1182, 1184, for example by section line 6-6 or the like.

The electrodes 1120, 1130 are each formed from an electrically conductive material; for example, from an electrically conductive metal. Example electrically conductive materials that can be used to form the electrodes 1120, 1130 include copper and nickel. Each electrode can be formed as a busbar.

In some embodiments, the electrodes 1120 and 1130 are attached to the AAF lens 1100 using an electrically conductive adhesive 1128 and 1138, for example, an electrically conductive epoxy or an electrically conductive tape. Exemplary electrically conductive epoxies useful for attaching an electrode 1120 or 1130 to the AAF lens 1100 include a silver-containing epoxy. Exemplary silver-containing epoxies include and epoxy provided by MG Chemicals Ltd., Ontario, Canada (MG Chemicals epoxy); and a Frost Fighter branded silver-containing epoxy, manufactured by The PipeKnife Company of Golden, Colorado, USA (Frost Fighter epoxy). In some exemplary embodiments, a standard defroster grid repair paint may be used, in some embodiments in addition to an electrically conductive epoxy, to improve electrical conductivity of an interface between an electrode 1120 or 1130, and a heater layer 1100.

In embodiments that include an electrically conductive adhesive 1128, 1138, the electrodes 1120, 1130 are in electrical communication with the electrically conductive adhesive and the electrically conductive adhesive is in electrical communication with the heater layer 1110. In these embodiments, the electrodes 1120, 1130 are in electrical communication with the heater layer 1110 via the electrically conductive adhesive 1128, 1138.

In some exemplary embodiments, an electrode 1120, 1130 may be formed using an electrically conductive tape that includes an adhesive layer, in which case a separate electrically conductive adhesive 1128, 1138 may not be required. An exemplary electrically conductive tape includes a copper tape. In these embodiments, the electrically conductive tape is disposed in electrical communication with the heater layer 1110.

Each electrode 1120, 1130 includes multiple electrical contacts; for example, electrical contacts 1122, 1124, 1132, and 1134. Each electrical contact 1122, 1124 of the first electrode 1120 is connected to a first wire lead 1152. Each electrical contact 1132, 1134 of the second electrode 1130 is connected to a second wire lead 1154.

The wire leads 1152, 1154 are attached to the electrodes in a wire lead connection process step. In an exemplary embodiment, the wire leads 1152, 1154 are connected to the electrodes 1120, 1130 using a soldering operation. Alternatively, the wire leads 1152, 1154 may be connected to the electrodes 1120, 1130 with a mechanical connector; for example, a releasable clip. In an alternative embodiment, as previously disclosed, the electrical contacts can include contacts for mating with matching contacts; for example, with a pogo pin style electrical connector. In an exemplary embodiment, a wire lead 1152 or 1154 includes an electrically conductive wire and is electrically coupled, via an electrical contact 1122, 1124, 1132, or 1134 to an electrode 1120, 1130. As disclosed herein, and referring to FIG. 3, an alternative electrical connection with an electrode 1120 or 1130 can include an electrical contact, e.g. 1222 for mating with a pogo pin style electrical connector 1322.

In non-limiting exemplary embodiments, at least one, and in some embodiments two or more, electrical leads wire leads 1152, 1154 or connectors (e.g., 1122 or 1222) are connected to each electrode 1120, 1130. In non-limiting examples, from 1 to 5 wire leads or connectors are attached to each electrode. For example, 2, 3, 4, or 5 wire leads or connectors may be attached to each electrode. In an embodiment 2 wire leads or connectors are attached to each electrode. In another exemplary embodiment, 5 wire leads or connectors are attached to each electrode.

The wire leads 1152, 1154 are in electrical communication with the electrical contacts 1122, 1124, 1132, and 1134 which are in electrical communication with the electrodes 1120, 1130. The electrodes 1120, 1130 are in electrical communication with the heater 1110 layer; in some embodiments via the electrically conductive adhesive 1128, 1138.

Referring now to FIGS. 2 and 5, the wire leads 1152, 1154 can be electrically connected to a power source that is part of the power and control system 1600, for example, to a DC power source. In an exemplary embodiment, the first wire leads 1152 are electrically connected to a positive terminal of the power source while the second wire leads 1154 are electrically connected to a negative terminal of the power source. Alternatively, the second wire leads 1154 can be connected to the positive terminal of the power source and the first wire leads 1152 can be connected to the negative terminal of the power source.

As shown in FIG. 6, an additional display device 170 can be positioned behind an AAF lens 1100. The additional display device 170 is disposed between the AAF lens 1100 and a user when the additional display device 170 and the AAF lens are both worn by the user. The additional display device 170 can include a passive or active viewing device. For example, an additional display device 170 can include an active or passive lens or display screen; or a lens of a pair of prescription or non-prescription spectacles. In an exemplary embodiment, the additional display device includes an augmented reality (AR) display for example, a display that uses waveguide technology, e.g., a waveguide combiner. In an exemplary embodiment, the additional display device 170 includes a heads-up display (HUD) positioned in front of an eye of a user. The additional display 170 can include a flat or a curved display surface.

Referring now to FIGS. 6 and 7, the AAF lens 1100 includes an inner surface 1190 and an outer surface 1192. As noted herein, inner surface 1190 faces the face of a user who is wearing eyewear that includes the AAF lens 1100. The AAF lens 1100 includes the lens base 1050, the heater layer 1110, and one or more functional layers 1160, 1162.

The heater layer 1110 is disposed on the inner surface 1190 of the AAF lens 1110. One or more functional layers, e.g. functional layers 1160, 1162, are disposed on the outer surface 1192 of the AAF lens. Exemplary functional layers include a tint layer, an antireflective layer, and a hydrophobic layer. Additional or alternative exemplary functional layers include one or more of: an anti-fog layer; an anti-glare layer; a scratch resistant layer; a hydrophilic layer; a thermally insulating layer; a color enhancement filter; a chroma enhancement filter; a laser attenuation filter layer; a layer including an electrochromic cell; an electrochromic filter layer; and a layer that includes a color enhancement filter.

In an exemplary embodiment, a first functional layer 1160 that includes a tint and/or antireflective layer is disposed on the lens base 1050 and a second functional layer 1162 that includes a hydrophobic coating is disposed on the first functional layer 1160. Exemplary embodiments and an AAF lens 1100 can include more or fewer functional layers; for example, an AAF lens may include one, three, four, or more functional layers disposed on an outer surface 1192 of the AAF lens 1100. Some embodiments of the AAF lens 1100 do not include any functional layers.

6.2.2 Exemplary AAF System

Figure 8:
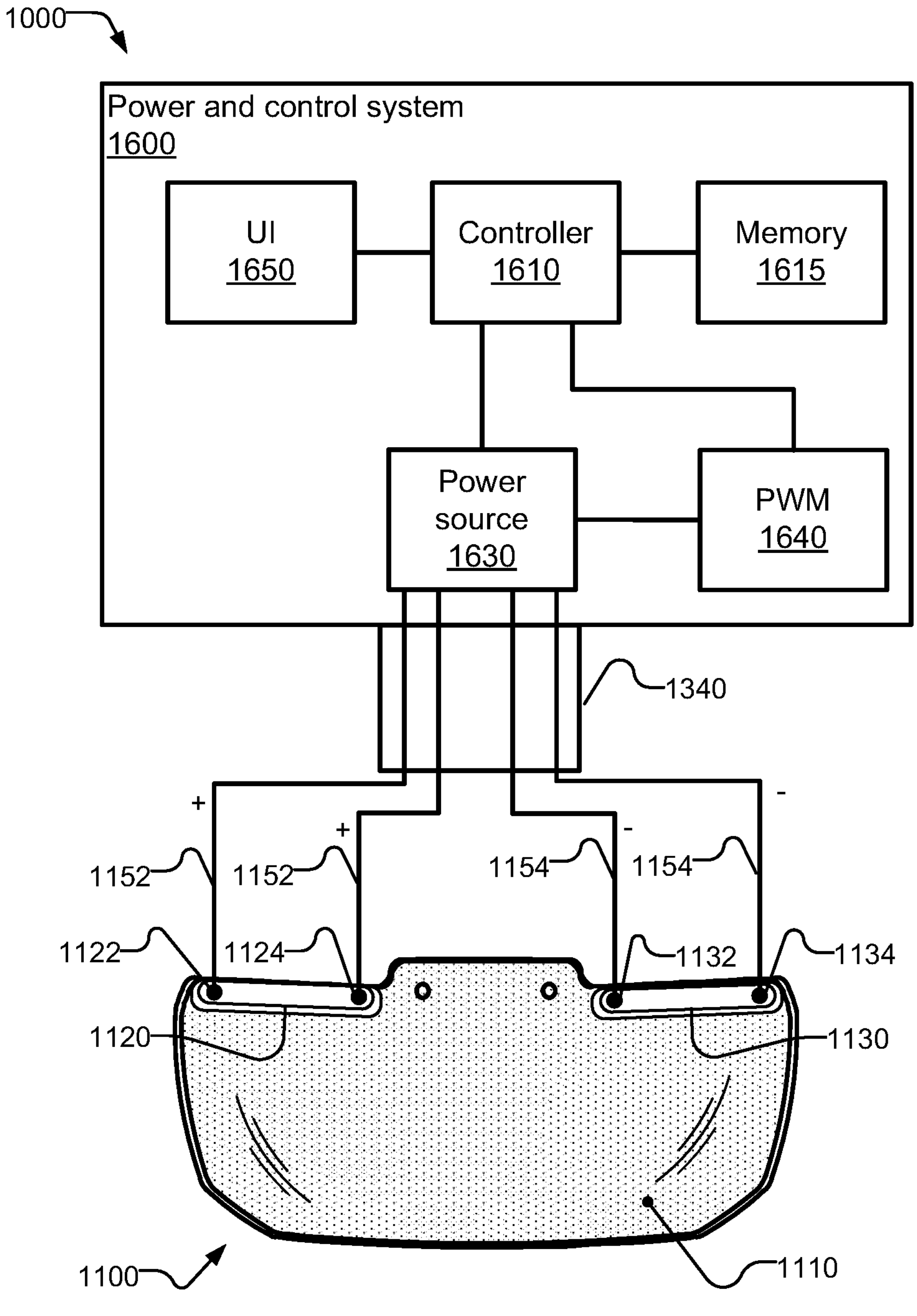
FIG. 8 depicts an AAF system of FIG. 1 including a power and control system shown in schematic view.

Referring to FIG. 8, an AAF system 1000 includes an AAF lens 1100 and a power and control system 1600. The power and control system 1600 includes a controller 1610 that includes or is in communication with a memory 1615. The controller 1610 is communicatively connected with a power source 1630 and with a pulse width modulator (PWM) 1640. The power source 1630 provides electrical power signals to the AAF lens 1100. The PWM 1640 controls a duty cycle of the power source 1630. The PWM 1640 is electrically connected to the power source 1630.

The power and control system further includes a user interface (UI) 1650 that is in communication with the controller 1610. The UI enables a user to enter control commands for the controller 1610. The controller 1610 communicates control signals to the power source 1630 and the PWM 1640 for controlling operation thereof; for example, in response to the control commands. In some embodiments, the processor 1610 communicates control signals based at least upon information stored in the memory 1615.

The AAF lens 1100 includes a first electrode 1120 and a second electrode 1130, each with 2 electrical contacts 1122, 1124 and 1132, 1134. The first electrode 1120 is connected to a positive terminal of the power source 1630 over a power pathway that includes two wire leads 1152 and the cable 1340. The second electrode 1130 is connected to a negative terminal of the power source 1630 over a power pathway that includes two wire leads 1154 and the cable 1340. In alternative embodiments, the electrodes 1120 and 1130 can each have more or fewer electrical contacts, and corresponding wire leads; for example, 5 electrical contacts per electrode.

The controller 1610 communicates command signals to the power source 1630 to control the power source to provide an electrical power signal; for example, a 9V electrical power signal, to the heater layer 1110 of the active anti-fog lens 1100. The electrical power signal produces electrical current that passes through the heater layer.

The controller 1610 communicates command signals to the pulse width modulator 1640 which in turn provides a PWM signal to the power source 1630. The power source 1630 operates with a duty cycle corresponding to the PWM signal. Example duty cycles can range 1 to 100% wherein the power source 1630 provides an electrical signal to the heater layer for a portion of a time period, where the portion of the time period corresponds to the duty cycle; for example, 1%, 10%, 30%, 50%, 60%, or 100% on the time period.

In embodiments, the UI 1650 includes one or more controls that allow a user to select at least one operational parameter of the AAF system 1000. An exemplary, non-limiting, UI 1650 includes one or more of: buttons or switches; a dial selector; a slidable or rotatable continuous range selector; a touch screen; a voice recognition device; or any other suitable user interface device. In some embodiments, the UI 1650 includes or comprises a graphical user interface (GUI) that is displayed on a screen component of the power and control system 1600 or that is displayed on a screen of a separate device; for example, a GUI that is displayed on a screen of an end user device (EUD), not shown, that is in communication with the power and control system 1600.

In a particular example, referring now to FIGS. 1 and 8, an exemplary power and control system 1600 includes two or more buttons 1602 that form at least a portion of the UI 1650. A user can manipulate the buttons 1602 to select an operating mode of the AAF system 1000 and generate control commands that are communicated from the UI 1650 to the controller 1610. In response to manipulation of the buttons 1602 by the user, the controller 1610 generates and communicates control signals to the power source 1630 and/or the PWM 1640. In some embodiments, a UI 1650 can include a software application running on an end user device (EUD) that presents, on a screen of the EUD, icons, menu, or other selection interface that a user can interact with to select at least one operational parameter of the AAF system 1000. Exemplary EUDs include a smartphone, a tablet computer, or another computerized device that includes a display screen.

In an exemplary embodiment, a user interacts with the UI 1650 to provide instructions to turn the AAF system 1000 on or off and to select a particular duty cycle. In an exemplary embodiment, the UI 1650 is configured to allow a user to select one of a low, medium, high, or off setting. In a particular exemplary embodiment, a low setting corresponds to a 30% duty cycle, a medium setting corresponds to a 60% duty cycle, and a high setting corresponds to a 100% duty cycle. In an alternative embodiment, the UI can be configured to allow a user to directly select a particular duty cycle, e.g. by entering a number or by operating a slider or wheel.

The controller 1610 receives a control command signal from the UI 1650 that includes a selected duty cycle. The controller 1610 generates, and communicates to the PWM 1640, one or more control signals that include the selected duty cycle. The PWM communicates a PWM signal corresponding to the selected duty cycle to the power source 1630 or otherwise controls operation of, or affects output of, the power source 1630 to provide, to the AAF lens 1100, electrical power signals according to the selected duty cycle. In other embodiments, the UI 1650 may be configured to allow a user to select from more or fewer settings, each of which correspond to a particular duty cycle.

6.2.3 Exemplary Current Flow Through a Heater Layer

Figure 9:
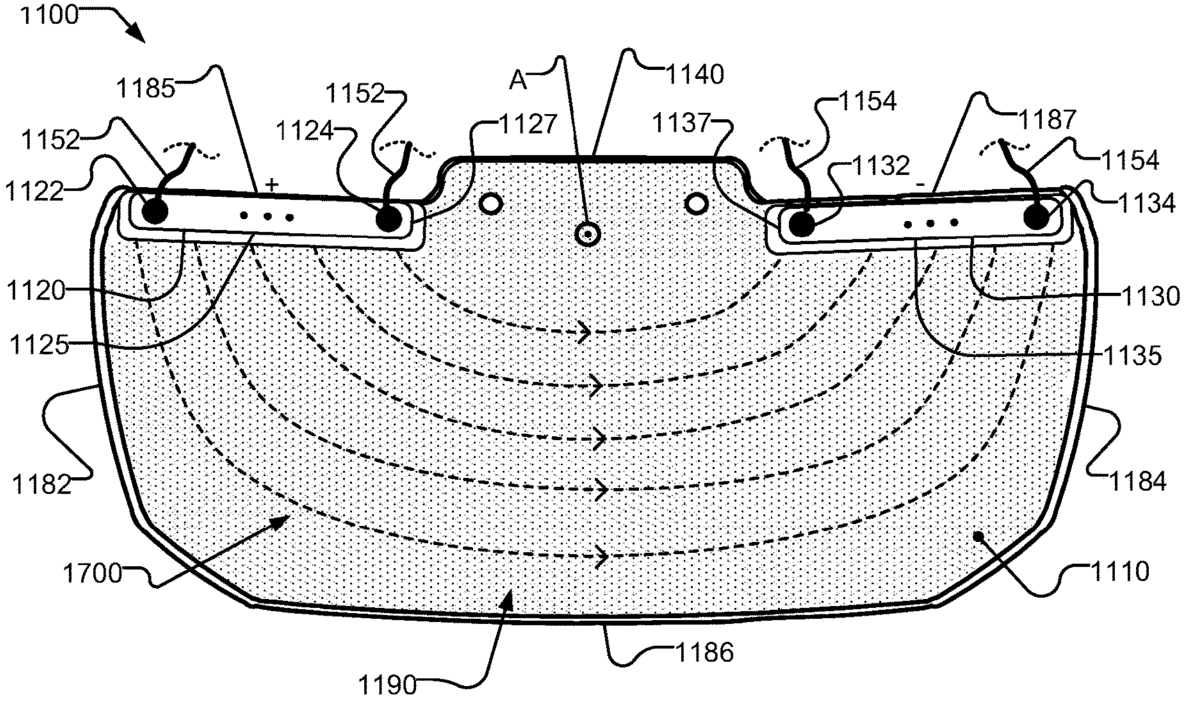
FIG. 9 is a rear view of the AAF lens of FIG. 2 illustrating current flow through a heater layer of the lens.

Referring to FIG. 9, an exemplary embodiment of an AAF lens 1100 is shown. Dashed lines 1700 indicate current flow between the first electrode 1120 and the second electrode 1130. The electrodes 1120, 1130 may be in direct electrical communication with the heater layer 1110 or may be in electrical communication with the heater layer via an electrically conductive adhesive 1128, 1138 disposed between the electrode and the heater layer 1110.

An AAF lens according to the subject technology includes electrodes or busbars disposed along non-opposing edges of a lens or of a heated portion of the lens. For example, each electrode 1120 and 1130 is located adjacent to a top edge of the lens, 1185 and 1187 respectively. The first electrode 1120 is disposed proximate to the left edge 1182 and top left edge 1185 of the AAF lens 1100. The second electrode 1130 is disposed proximate to the right edge 1184 and top right edge 1187 of the AAF lens 1100. The first and the second electrodes 1120, 1130 are separated from each other by the mounting boss 1140. In an alternative embodiment that does not include the mounting boss (not shown), the first and second electrodes 1120, 1130 may be separated from each other by a specified distance. In still further embodiments, the first and second electrodes 1120 and 1130 may both be disposed along the bottom edge 1186 of the AAF lens 1100.

The first electrode 1120 has a length corresponding to a primary edge 1125 and a width corresponding to a secondary edge 1127. The second electrode 1130 has a length corresponding to a primary edge 1135 and a width corresponding to a secondary edge 1137. As defined herein, the length of a primary edge (1125 or 1135) of an electrode (1120 or 1130) is greater than the length of secondary edge (1127 or 1137) of the electrode. For example a primary edge may be at least twice as long as a secondary edge; e.g. a primary edge may be at least four to six times longer than a secondary edge. The first and second electrodes, 1120 and 1130, are disposed on the AAF lens 1100 on non-opposing edges of the lens such that the primary edge 1125 of the first electrode does not oppose the primary edge 1135 of the second electrode. In the example embodiment, the primary edge 1125 of the first electrode 1120 is disposed rotated approximately 180 degrees relative to the primary edge 1135 of the second electrode 1130 around an axis A that extends perpendicularly from the inner surface 1190 of the AAF lens 1100.

A power source (not shown) is in electrical communication with the AAF lens 1100. Referring now to FIG. 8, the power source may include power source 1630 of a power and control system 1600. Referring once again to FIG. 9, the power source provides electrical current to the electrodes 1120 and 1130. When an electrical signal is provided to the heater layer 1110 by the power source via the electrodes 1120, 1130, electrical current passes through the heater layer, as illustrated by dashed lines 1700.

It is notable that the electrode arrangement of the present disclosure differs from electrode arrangements according to the known art. Known heated eyewear include a heater layer on a lens with electrodes or busbars in electrical communication with the heater layer. The known electrodes or busbars are disposed along opposing edges of the lens, i.e. on opposing sides of a heating zone of the heater layer such that electrical current passes through the heater layer from one edge towards an opposing edge of a lens. For example current flow according to the known art is from a top edge of a lens towards a bottom edge of the lens; or from a left edge of a lens towards a right edge of the lens; or vice versa.

Without wishing to be constrained by a particular theory, the inventors believe that electrical current 1700 from a first electrode disposed near a top edge of the AAF lens 1100 (for example from the first electrode 1120 disposed near the top left edge 1185), downwards towards the bottom edge 1186 of the lens, across the lens (for example in a direction extending from the left edge 1182 toward the right edge 1184), and upwards to another electrode (for example to the second electrode 1130) near the top of the lens, e.g. near top right edge 1187. Current passes more rapidly over relatively shorter current paths, which are located closer to the top edges 1185 and 1187 which engenders rapid heating of the regions corresponding to the shorter current paths. Electrical current can flow from left to right or from right to left, depending on which electrode is configured as a positive electrode and which electrode is configured as a negative electrode.

6.2.4 Experimental Results 6.2.4.1 Exemplary Lens Heating Experiments

Figure 10:
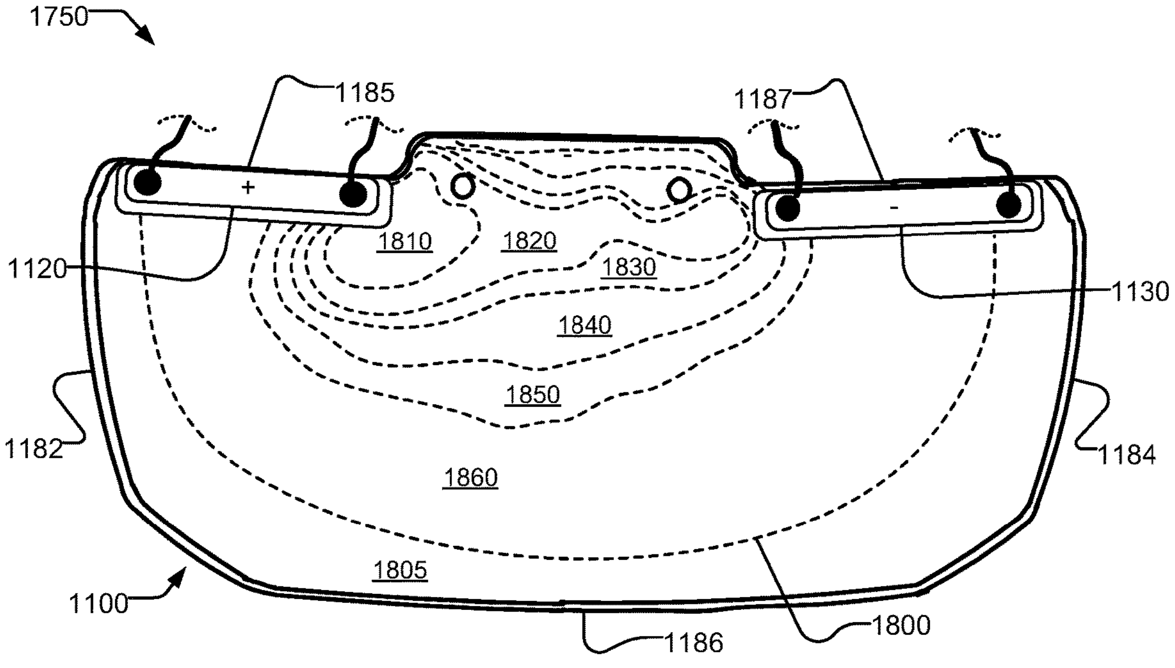
FIG. 10 is a rear view of the AAF lens of FIG. 2 illustrating heat distribution.

FIG. 10 shows a schematic view of a thermal image 1750 of an AAF lens 1100 under power. The AAF lens 1100 includes a first electrode 1120, which is configured as a positive electrode, and a second electrode 1130, which is configured as a negative electrode. Referring now to FIGS. 8 and 10, power was supplied to the electrodes 1120, 1130 by an embodiment of a power and control system 1600.

Referring once again to FIG. 10, the thermal image 1750 was acquired under the following conditions: room temperature=21.8° C. and humidity=65%. An electrical power signal provided to the AAF lens 1100 had the following characteristics: voltage=9V DC, duty cycle=100%. Electrical power was applied to the AAF lens 1100 and temperature and temperature distribution of the AAF lens 1100 were observed using a thermal camera. The thermal image 1750 was acquired after temperature equilibrium of the AAF lens 1100 was reached, i.e. when no further changes in temperature and temperature distribution were observed.

The thermal image 1750 includes multiple temperature bands, as indicated by dashed lines. The first heated region 1800 includes temperatures ranging from approximately 24° C. to approximately 40° C. Temperatures outside of the first heated region 1800, in region 1805, range from approximately room temperature to approximately 24° C., near the interface with the first heated region 1800. Approximate temperature ranges observed in the temperature bands 1810 through 1860 are included in Table 1:

| Region | Temperature |
|---|---|
| 1810 | 38-40° C. |
| 1820 | 35-38° C. |
| 1830 | 33-35° C. |
| 1840 | 30-33° C. |
| 1850 | 28-30° C. |
| 1860 | 24-28° C. |

Temperature gradients within the first heated region 1800 are evident. The hottest regions 1810 and 1820 of the lens are located near a central portion of a horizontal dimension of the lens, between left edge 1182 and right edge 1184. The hottest regions 1810 and 1820 have temperatures that are approximately 1.5 to 1.7 times greater than a temperature of the region 1805 disposed outside of the first heated region 1800. Exemplary temperatures in the first heated region 1800 are approximately 1.2 to 1.7 times greater than a temperature of the region 1805. These hottest regions 1810 and 1820 are on a portion of the AAF lens 1100 that includes the shortest distances for current to travel between the electrodes 1120 and 1130. The hottest regions generate heat more rapidly than other regions of the lens.

The first heated region 1800 of the AAF lens 1100 is located in front of a user's eyes, and in the user's line of sight, when the AAF lens 1100 is worn by the user as a component of eyewear; for example, when the AAF lens is attached to a helmet that is worn by the user. The first heated region of the lens 1800 defogs faster than other regions of thermal image 1750 of the AAF lens 1100. The subject technology thus enables preferential defogging of the portion of the AAF lens directly in front of the eyes, i.e. of the first heated region 1800, while the rest of the lens may not be defogged as quickly as the first heated region. This is advantageous for maintaining the user's situational awareness by rapidly clearing a region of the lens directly in the user's line of sight even while other portions of the lens may remain fogged for a longer period of time.

6.2.4.2 Exemplary Lens Defogging Experiments

Figure 11:
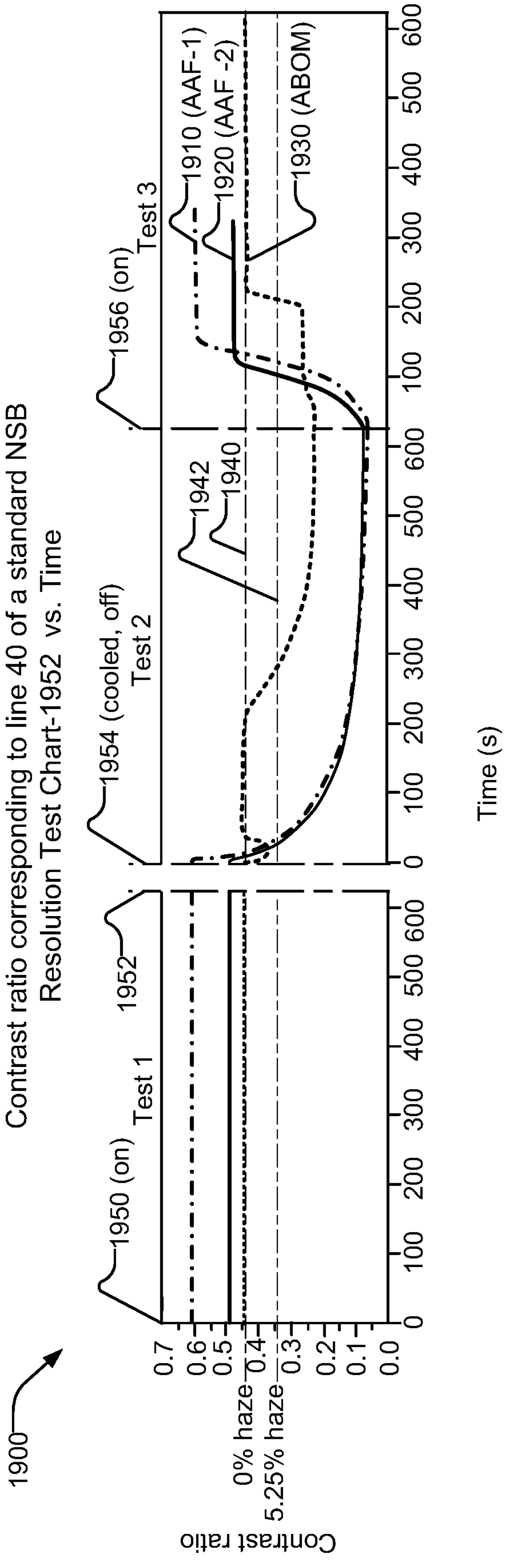
FIG. 11 is a data plot illustrating results of defogging experiments for AAF lenses of the AAF system shown in FIG. 8.

FIG. 11 includes a plot 1900 showing contrast ratio versus time. The contrast ratio values positively correlate with a greater observable resolution, wherein a higher contrast ratio value can be correlated with a higher observable resolution. A contrast ratio value below a threshold value, for example below 0.45, is an indication that lens is at least partially fogged. Plot 1900 illustrates defogging test results for two embodiments of AAF lenses 1100 as well as test results for a consumer off the shelf product, ABOM HEET goggles, provided by Abom, Inc., Portland, OR.

A first visor, Visor 1, and a second visor, Visor 2, that each include an AAF lens (e.g. 1100) according the technology described herein were tested along with the ABOM HEET goggles. Results for visors configured with AAF lenses are indicated by dot-dash-dot line plot line 1910 and solid plot line 1920. Results for the ABOM HEET goggles are indicated by dashed plot line 1930.

Now referring to FIGS. 5 and 11, the visors had the following configurations:

Visor 1 (plot line 1910): Includes first and second electrodes 1120, 1130 each made from nickel adhered to the AAF lens 1100 with adhesive 1128, 1138 consisting of Frost Fighter epoxy.

Visor 2 (plot line 1920): Includes first and second electrodes 1120, 1130 each made from nickel, adhered to the AAF lens 1100 with adhesive 1128, 1138 consisting of MG Chemicals epoxy.

Testing was performed using an Eyewear Fog Tester Apparatus at the Natick Soldier Research, Development, and Engineering Center (NSRDEC). The testing included exposing one or more lenses under test to a fog environment; for example exposing the lenses under test to a humid environment in which condensation of water vapor on the lenses may be expected. More particularly, testing was performed following a NSRDEC Fog Tester protocol. An apparatus that is substantially similar to the Eyewear Fog Tester Apparatus is disclosed in U.S. Pat. No. 8,365,619, which is incorporated herein by reference in its entirety.

Testing following the NSRDEC Fog Tester protocol included mounting eyewear on a hollow model of a human head, over the eye portions of the model. The model includes through holes between the hollow interior of the model and the exterior of the model at the eye locations. A video sensor was positioned behind the model and a standard NSB Resolution Test Chart-1952 was positioned in front of the model. A hole passing through the model provided a clear line of sight from the camera to the Resolution Test Chart through a lens of the eyewear under test, e.g. through an AAF lens 1100 or a lens of ABOM HEET goggles. When AAF lenses 1100 were tested, the camera line of sight passed through the first heated region 1800.

Following the NSRDEC Fog Tester protocol, fog conditions were created by using a pump to fill the interior of the model with humid air, which was allowed to pass through the holes at the eye locations and impinge on an inner surface of a lens, i.e. of a surface of a lens facing the model. For example, humid air was allowed to impinge on the inner surface 1190 of embodiments of an AAF lens 1100 and on the inner surface of an ABOM goggle lens.

Concurrently to creation of the fogging conditions, and following the NSRDEC Fog Tester protocol, the video sensor was used to image the standard NSB Resolution Test Chart-1952 through the goggle lens, e.g. through AAF lens 1100. Images of the Test Chart made during testing were processed using standard techniques to generate resolution scores, as is known in the art.

A known haze calibration standard was used to estimate a haze magnitude as a function of resolution magnitude, as is also known in the art. A lower resolution is indicative of a greater haze magnitude. Haze magnitude of 0% indicates that a lens is clear of condensation while haze magnitude of greater than 0% indicates that a lens is at least partially fogged by condensation, with an amount of fogging positively correlated with haze magnitude.

Test 1 includes testing of subject eyewear in a powered state while they are subjected to fogging conditions. Test samples of the subject eyewear were powered on, allowed to preheat, and remained on while being exposed to fog conditions for 10 minutes, beginning at time stamp 1950 and ending at time stamp 1952. Power settings for the visors with AAF lenses 1100, corresponding to plot lines 1910 and 1920, were 9V DC power applied at 100% duty cycle, i.e. at a high setting.

The plot 1900 shows that visors that include AAF lenses and the ABOM goggles did not show any fogging when exposed to constant fog conditions for 10 minutes while they were powered on. This is evident in that contrast for each remained at or above a contrast level correlating to 0% haze, indicated by line 1940.

Following test 1, the test samples were powered off at timestamp 1952 and allowed to cool for 10 minutes while remaining on the NSRDEC Fog Tester apparatus, thereby reducing a temperature of the test samples to approximately a chamber temperature of 6° C. This cooling off period is indicated by a gap between time stamp 1952 and time stamp 1954.

During test 2, the test samples were exposed to fog conditions while powered off. The unpowered test samples were exposed to fog conditions for 10 minutes, beginning at time stamp 1954 and ending at time stamp 1956. All test samples fogged up under the test conditions, as indicated by plot lines 1910, 1920, and 1930 dipping below line 1940, which corresponds to 0% haze. The visors that include AAF lenses 1100, corresponding to plot lines 1910 and 1920, took longer to become fogged up as compared to ABOM HEET goggles as indicated by plot line 1930 dipping below line 1940 sooner than plot lines 1910 and 1920.

Test 3 immediately followed test 2. At time stamp 1956, power was supplied to subject eyewear that remained fogged as a result of conditions applied during test 2. The subject eyewear was not exposed to further fog conditions following time stamp 1956, i.e. no additional humid air was provided.

Power settings for the visors with AAF lenses 1100, corresponding to plot lines 1910 and 1920, were 9V DC power applied at 100% duty cycle, i.e. at a high setting.

An amount of time it took to clear the lenses after power was supplied was determined. Results show that eyewear with AAF lenses 1100, indicated by plot lines 1910 and 1920, cleared faster than the ABOM HEET goggles, indicated by plot line 1930. The first AAF lens 1100, indicated by plot line 1910, cleared of condensation in approximately 2 minutes and 25 seconds while the second AAF lens 1100, indicated by plot line 1920, cleared in approximately 2 minutes. The ABOM HEET lens, indicated by plot line 1930, took 5 minutes 25 seconds to clear. Based on these results, an AAF lens 1100, and in particular a first heated region 1800 of the AAF lens 1100 is operable to clear fog faster than a known COT heated lens.

Testing was conducted to determine defogging times associated with multiple embodiments of AAF lenses, e.g. of AAF lens 1100. Table 2 includes details of these embodiments, labeled 1101 through 1106. The embodiments were created following the methods described in relation to FIGS. 4A, 4B, and 5 through 7 with the exception that lenses 1101 and 1102 did not include a separate conductive adhesive 1120 and 1130. Instead, for these embodiments, copper tape electrodes were directly adhered to an AAF lens 1100. AAF lens embodiments of Table 2 include a number of different types of electrodes 1120, 1130, electrically conductive adhesives 1128, 1138, and additional functional layers as shown in Table 2 below. For all embodiments, two wire leads 1152, 1154 were soldered onto the electrodes 1120, 1130. Each lens includes a heater layer 1110 formed with ITO.

TABLE 2

| AAF lens embodiments | | | |
|---|---|---|---|
| AAF lens | Functional layer (1162) | Electrodes (1120, 1130) | Conductive Adhesive (1120, 1130) |
| 1101 | None | Copper tape | N/A |
| 1102 | Tint | Copper tape | N/A |
| 1103 | None | Nickle | Frost Fighter Epoxy |
| 1104 | Tint | Nickle | Frost Fighter Epoxy |
| 1105 | None | Nickle | MG Chemicals Epoxy |
| 1106 | Tint | Nickle | MG Chemicals Epoxy |

Defogging experiments included fogging the lenses, i.e. allowing water vapor to condense on the lenses, by exposing the lenses to fogging conditions. Fogging conditions included positioning a lens being tested over a container of boiling water under the following conditions: Room temperature=72° F.; humidity=65%.

The lenses (1101 through 1106) were exposed to a fog environment for 30 seconds, at which point they were fully fogged; i.e. water vapor was deposited on at least an inner surface, e.g. 1190, of each lens. The lenses were then powered on. Each lens was operated at high power level (100% duty cycle) with a 9V electrical power signal. Defogging time was measured, and recorded in Table 3. Defogging time was defined as amount of time for a lens to appear to be clear of condensation after an electrical power signal was applied to the lens.

TABLE 3

| Defogging Time for embodiments of AAF lens 1100 | |
|---|---|
| Lens | Avg. defog time (Min:sec) |
| 1101 | 1:49 |
| 1102 | 1:02 |
| 1103 | 1:00 |
| 1104 | 1:06 |
| 1105 | 1:13 |
| 1106 | 1:23 |

6.2.4.3 Exemplary Lens Power Experiments

Referring to Table 2, experiments were performed to determine power generated on multiple embodiments of AAF lenses 1100. Electrical power signals were supplied to embodiments of AAF lenses 1101 through 1106 and power was determined. Each lens was subjected to three electrical power signals, each at 9V with one of three duty cycle settings: low (30% duty cycle); medium (50% duty cycle); and high (100% duty cycle). Current was measured and power was calculated based on the measured current and the applied 9V electrical signal. Results are included in Table 4.

TABLE 4

| Power at low, medium, and high settings | | | |
|---|---|---|---|
| Lens | Power - Low setting (mW) | Power - Medium setting (mW) | Power - High setting (mW) |
| 1101 | .328 | 0.616 | 1.05 |
| 1102 | .315 | 0.626 | 1.10 |
| 1103 | .388 | 0.766 | 1.28 |
| 1104 | .334 | 0.658 | 1.09 |
| 1105 | .350 | 0.686 | 1.13 |
| 1106 | .380 | 0.712 | 1.18 |

Further experiments were conducted to determine electrical resistance values corresponding to embodiments of AAF lenses; for example, embodiments of AAF lens 1100. All lenses included a heater layer 1110 formed from ITO and electrodes 1120, 1130 were fabricated from nickel and adhered to the lens with either Frost Fighter epoxy or MG Chemicals epoxy. Wire leads 1152, 1154 were soldered to the electrodes. A first group of the embodiments included 2 wire leads per electrode and a second group of the embodiments included 5 wire leads per electrode. A 9V power signal was applied to the lenses. Power and current and power were measured, and electrical resistance was calculated. Electrical resistance corresponding to lenses that included 2 wire leads per electrode ranged from 62.7 ohms to 71.2 ohms. Electrical resistance corresponding to lenses that included 5 wire leads per electrode ranged from 64.3 ohms to 74.4 ohms.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term “processor” or “processing circuitry” may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term “computer-readable storage media” refers to physical storage media, and not signals, carrier waves, or other transient media.

It will also be recognized by those skilled in the art that, while the disclosure has been described above in terms of preferred embodiments, it is not limited thereto. Various features and aspects of the above-described disclosure may be used individually or jointly. Further, although the disclosure has been described in the context of its implementation in a particular environment, and for particular applications (e.g. for helmet-mounted visors), those skilled in the art will recognize that its usefulness is not limited thereto and that the present disclosure can be beneficially utilized in any number of environments and implementations where it is desirable to clear condensed vapor from lenses or other surfaces. Accordingly, the claims set forth below should be construed in view of the full breadth and spirit of the disclosure as disclosed herein.

What is claimed is:

1. A helmet system comprising:

a helmet;

a lens having a conductive layer, the lens is attachable to a lens holder, the lens holder is attachable to the helmet;

a first electrode disposed proximal to the top edge of the lens in electrical communication with the conductive layer;

a second electrode disposed proximal to the top edge of the lens in electrical communication with the conductive layer; and a power source in electrical communication with both the first electrode and the second electrode and configured to provide electrical current through the conductive layer, wherein:

the conductive layer is configured to receive electrical current and includes at least one region that, in response to the conductive layer receiving electric current, generates heat faster than other regions of the conductive layer;

the at least one region is disposed between the first electrode and the second electrode; and the at least one region is positioned corresponding to eye positions of a wearer of the helmet when the lens is attached to the lens holder and the lens holder is attached to the helmet.

2. An active anti-fog (AAF) eyewear system comprising:

a lens holder;

an AAF lens comprising a conductive layer;

a first electrode disposed proximal to the top edge of the lens in electrical communication with the conductive layer;

a second electrode disposed proximal to the top edge of the lens in electrical communication with the conductive layer; and a power supply in electrical communication with the conductive layer;

wherein:

the AAF lens is attachable to the lens holder;

the lens holder is configurable to dispose the attached AAF lens in front of eyes of a user of the AAF eyewear system with a first region of the lens positioned along a line of sight of the user; and when the power supply provides an electric current to the conductive layer, the first region of the AAF lens generates heat more rapidly than other regions of the AAF lens, wherein the first region of the lens is disposed between the first electrode and the second electrode.

3. The AAF eyewear system of claim 2, wherein the AAF lens is removably attachable to the lens holder.

4. The AAF eyewear system of claim 2, wherein the lens holder is mountable on a helmet and the lens holder is configurable to dispose the attached AAF lens in front of eyes of the user, with the first region of the lens positioned along a line of sight of the user, when the lens holder is mounted on the helmet and the user wears the helmet.

5. The AAF eyewear system of claim 2, wherein when the power supply provides an electric current to the conductive layer, condensed fog is cleared from a first region of the lens in 120 seconds or less when tested according to a NSRDEC Fog Tester protocol.

6. The AAF eyewear system of claim 2, further comprising a first electrode and a second electrode; wherein the first electrode is disposed proximal to a first edge of the AAF lens and the second electrode is disposed on a second edge of the AAF lens; and wherein the first edge of the AAF lens and the second edge of the AAF lens are non-opposing edges.

7. An active anti-fog (AAF) lens for eyewear comprising:

an optical lens having an inner surface that is proximal to a wearer when the eyewear is worn, an outer surface that opposes the inner surface, an electrically conductive layer disposed on the inner surface of the optical lens;

a first electrode disposed proximal to a top edge of the optical lens in electrical communication with the electrically conductive layer;

a second electrode disposed proximal to the top edge of the optical lens in electrical communication with the electrically conductive layer; and a power source in electrical communication with both the first electrode and the second electrode and configured to provide electrical current through the electrically conductive layer, wherein the lens is disposed in a frame that encloses at least a portion of the top edge and of the optical lens and does not enclose the bottom edge, wherein the frame covers the first and second electrodes and includes electrical contacts for electrically connecting with the first and second electrodes.

8. The AAF lens of claim 7, wherein the first electrode is disposed proximal to a right edge of the lens and the second electrode is disposed proximal to a left edge of the lens.

9. The AAF lens of claim 7, further comprising at least one functional layer disposed on the outer surface, the at least one functional layer comprising one or more of: a reflective coating; a hydrophobic coating; and a tint coating.

10. The AAF lens of claim 7, wherein the electrically conductive layer comprises indium tin oxide (ITO).

11. The AAF lens of claim 7, wherein when an electrical current supplied by the power source, at least a portion of the lens disposed between the two electrodes and extending towards a bottom edge of the lens is cleared of condensation in 120 seconds or less when tested according to a NSRDEC Fog Tester protocol.

12. The AAF lens of claim 7, wherein when an electrical current is supplied by the power source, a first portion of the lens corresponding to a line of sight of a user of the lens is cleared of condensation in 120 seconds or less when tested according to the NSRDEC Fog Tester protocol.

13. The AAF lens of claim 7, wherein when the lens for eyewear is exposed to a fog environment for at least 10 minutes and an electrical signal is subsequently supplied by the power source, the lens is cleared of condensation in 120 seconds or less.

14. The AAF lens of claim 7, wherein the first electrode and the second electrode are each electrically connected to the electrically conductive layer and are each adhered to the optical lens with an electrically conductive adhesive.

15. The AAF lens of claim 7, wherein the power source is electrically connected to the first electrode at two or more locations on the first electrode and is electrically connected to the second electrode at two or more locations on the second electrode.

16. The AAF lens of claim 7, wherein the power source is electrically connected to the first electrode at three or more locations on the first electrode and is electrically connected to the second electrode at three or more locations on the second electrode.

17. An active anti-fog (AAF) lens for eyewear comprising:

an optical lens having an inner surface that is proximal to a wearer when the eyewear is worn, an outer surface that opposes the inner surface, an electrically conductive layer disposed on the inner surface of the optical lens;

a first electrode disposed proximal to a top edge of the optical lens in electrical communication with the electrically conductive layer;

a second electrode disposed proximal to the top edge of the optical lens in electrical communication with the electrically conductive layer; and a power source in electrical communication with both the first electrode and the second electrode and configured to provide electrical current through the electrically conductive layer, wherein when the power source provides an electric current to the conductive layer, a first region of the AAF lens generates heat more rapidly than other regions of the AAF lens, the first region of the lens disposed between the first electrode and the second electrode.

* * * * *